US009666031B2

(12) United States Patent
Jaffe et al.

(10) Patent No.: US 9,666,031 B2
(45) Date of Patent: May 30, 2017

(54) WAGERING MACHINES HAVING THREE DIMENSIONAL GAME SEGMENTS

(75) Inventors: Joel R. Jaffe, Glenview, IL (US); Benjamin Gomez, Chicago, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 2574 days.

(21) Appl. No.: 12/304,608

(22) PCT Filed: Jun. 12, 2007

(86) PCT No.: PCT/US2007/013742

§ 371 (c)(1), (2), (4) Date: Dec. 12, 2008

(87) PCT Pub. No.: WO2007/146264

PCT Pub. Date: Dec. 21, 2007

(65) Prior Publication Data

US 2009/0291731 A1 Nov. 26, 2009

Related U.S. Application Data

(60) Provisional application No. 60/804,573, filed on Jun. 12, 2006, provisional application No. 60/826,822, filed on Sep. 25, 2006, provisional application No. 60/916,514, filed on May 7, 2007.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.
CPC ...... *G07F 17/3267* (2013.01); *G07F 17/3211* (2013.01)

(58) Field of Classification Search
CPC .......................... G07F 17/3211; G07F 17/3267
USPC .......................................... 463/16, 20, 32, 33
See application file for complete search history.

(56) References Cited

U.S. PATENT DOCUMENTS 5,011,146 A 4/1991 Lamle
5,174,569 A * 12/1992 Ngai .............................. 463/63
5,211,399 A 5/1993 Howard
(Continued)

FOREIGN PATENT DOCUMENTS

JP 2002-052169 A 2/2002
WO WO-2004/002591 A2 1/2004
(Continued)

OTHER PUBLICATIONS

"Machine Translation of JP 2002-52169", (2002), 6 pgs.
(Continued)

*Primary Examiner* — Omkar Deodhar
*Assistant Examiner* — Wei Lee
(74) *Attorney, Agent, or Firm* — Nixon Peabody LLP

(57) ABSTRACT

Systems and methods provide a three-dimensional wagering game segment on a wagering game machine. The systems and methods provide three-dimensional representations and movement through a scene. The scene may include target objects, and input may be received indicating actions to be taken with respect to the target objects. The scene may be defined as parts of a tile, and the tile may be part of a track of tiles.

25 Claims, 21 Drawing Sheets

(56) References Cited

U.S. PATENT DOCUMENTS

| | | | | |
|---|---|---|---|---|
| 5,580,055 | A | 12/1996 | Hagiwara | |
| 5,739,811 | A | 4/1998 | Rosenberg et al. | |
| 6,232,959 | B1 | 5/2001 | Pedersen | |
| 6,261,177 | B1 | 7/2001 | Bennett | |
| 6,270,411 | B1 | 8/2001 | Gura et al. | |
| 6,315,660 | B1 | 11/2001 | DeMar et al. | |
| 6,347,996 | B1 | 2/2002 | Gilmore et al. | |
| 6,406,369 | B1 | 6/2002 | Baerlocher et al. | |
| 6,554,704 | B2 | 4/2003 | Nicastro et al. | |
| 6,565,088 | B2 | 5/2003 | Perrie et al. | |
| 6,592,457 | B1 | 7/2003 | Frohm et al. | |
| 6,602,139 | B2 * | 8/2003 | Yamaguchi | 463/30 |
| 6,634,948 | B1 | 10/2003 | Hayashi et al. | |
| 6,644,664 | B2 | 11/2003 | Muir et al. | |
| 6,666,766 | B2 | 12/2003 | Baerlocher et al. | |
| 6,682,418 | B1 | 1/2004 | Mendes et al. | |
| 6,716,103 | B1 | 4/2004 | Eck et al. | |
| 6,811,482 | B2 | 11/2004 | Letovsky | |
| 6,866,585 | B2 | 3/2005 | Muir | |
| 6,886,585 | B1 | 5/2005 | King, Jr. et al. | |
| 6,887,157 | B2 | 5/2005 | LeMay et al. | |
| 6,896,615 | B2 | 5/2005 | Berman | |
| 6,932,700 | B2 | 8/2005 | Bennett et al. | |
| 6,997,805 | B2 * | 2/2006 | Vancura | 463/20 |
| 7,128,648 | B2 | 10/2006 | Watanabe | |
| 7,874,900 | B2 | 1/2011 | Ward et al. | |
| 7,874,909 | B2 | 1/2011 | Pryzby et al. | |
| 8,029,350 | B2 | 10/2011 | Pacey | |
| 2001/0021665 | A1 | 9/2001 | Gouji et al. | |
| 2001/0029202 | A1 | 10/2001 | Kondo et al. | |
| 2002/0016200 | A1 | 2/2002 | Baerlocher et al. | |
| 2002/0034976 | A1 | 3/2002 | Webb | |
| 2002/0039918 | A1 | 4/2002 | Anderson et al. | |
| 2002/0094856 | A1 | 7/2002 | Bennett et al. | |
| 2002/0097229 | A1 | 7/2002 | Rose et al. | |
| 2002/0103021 | A1 * | 8/2002 | Wood et al. | 463/23 |
| 2002/0103024 | A1 | 8/2002 | Jeffway et al. | |
| 2002/0107068 | A1 * | 8/2002 | Baerlocher et al. | 463/20 |
| 2002/0111208 | A1 | 8/2002 | Marta | |
| 2002/0111212 | A1 | 8/2002 | Muir | |
| 2002/0151361 | A1 * | 10/2002 | Goden et al. | 463/33 |
| 2002/0175466 | A1 | 11/2002 | Loose et al. | |
| 2002/0183105 | A1 * | 12/2002 | Cannon et al. | 463/16 |
| 2003/0003987 | A1 | 1/2003 | Estes et al. | |
| 2003/0032479 | A1 | 2/2003 | LeMay et al. | |
| 2003/0054871 | A1 | 3/2003 | Baerlocher | |
| 2003/0064781 | A1 | 4/2003 | Muir | |
| 2003/0064799 | A1 | 4/2003 | Goins et al. | |
| 2003/0087690 | A1 | 5/2003 | Loose et al. | |
| 2003/0092487 | A1 | 5/2003 | Meyer | |
| 2003/0100358 | A1 | 5/2003 | Kaminkow | |
| 2003/0109300 | A1 | 6/2003 | Walker et al. | |
| 2003/0190947 | A1 | 10/2003 | Baerlocher et al. | |
| 2003/0190950 | A1 * | 10/2003 | Matsumoto | 463/30 |
| 2004/0002380 | A1 | 1/2004 | Brosnan et al. | |
| 2004/0023714 | A1 | 2/2004 | Asdale | |
| 2004/0029636 | A1 | 2/2004 | Wells | |
| 2004/0033829 | A1 | 2/2004 | Pacey et al. | |
| 2004/0053686 | A1 * | 3/2004 | Pacey et al. | 463/25 |
| 2004/0077404 | A1 | 4/2004 | Schlottmann et al. | |
| 2004/0080507 | A1 | 4/2004 | Prittwitz | |
| 2004/0102244 | A1 | 5/2004 | Kryuchkov et al. | |
| 2004/0102245 | A1 | 5/2004 | Escalera et al. | |
| 2004/0130525 | A1 | 7/2004 | Suchocki | |
| 2004/0166936 | A1 | 8/2004 | Rothschild et al. | |
| 2004/0176164 | A1 | 9/2004 | Kobayashi et al. | |
| 2004/0192430 | A1 | 9/2004 | Burak et al. | |
| 2004/0204223 | A1 * | 10/2004 | Cuddy et al. | 463/17 |
| 2004/0233192 | A1 | 11/2004 | Hopper | |
| 2004/0266506 | A1 * | 12/2004 | Herbrich et al. | 463/6 |
| 2004/0266536 | A1 | 12/2004 | Mattice et al. | |
| 2005/0037843 | A1 | 2/2005 | Wells et al. | |
| 2005/0059487 | A1 | 3/2005 | Wilder et al. | |
| 2005/0075167 | A1 | 4/2005 | Beaulieu et al. | |
| 2005/0192090 | A1 | 9/2005 | Muir et al. | |
| 2005/0215319 | A1 | 9/2005 | Rigopulos et al. | |
| 2005/0233799 | A1 | 10/2005 | LeMay et al. | |
| 2005/0255908 | A1 | 11/2005 | Wells | |
| 2005/0261055 | A1 * | 11/2005 | Casey et al. | 463/20 |
| 2006/0030387 | A1 | 2/2006 | Jackson | |
| 2006/0052152 | A1 | 3/2006 | Tedsen et al. | |
| 2007/0010315 | A1 * | 1/2007 | Hein | 463/20 |
| 2007/0155463 | A1 * | 7/2007 | Ghaly | 463/16 |
| 2008/0108413 | A1 | 5/2008 | Gelber et al. | |
| 2008/0125221 | A1 | 5/2008 | Ward et al. | |
| 2008/0220850 | A1 | 9/2008 | Pacey | |
| 2008/0220863 | A1 | 9/2008 | Pacey | |
| 2009/0181769 | A1 | 7/2009 | Thomas et al. | |
| 2009/0298568 | A1 | 12/2009 | Pacey et al. | |
| 2011/0256921 | A1 | 10/2011 | Pacey et al. | |

FOREIGN PATENT DOCUMENTS

| | | | |
|---|---|---|---|
| WO | WO-2004/025589 | A2 | 3/2004 |
| WO | WO-2004/028650 | A1 | 4/2004 |
| WO | WO-2004/029893 | A1 | 4/2004 |
| WO | WO-2006/039257 | A1 | 4/2006 |
| WO | WO-2006/039324 | A2 | 4/2006 |
| WO | WO-2006/039348 | A1 | 4/2006 |
| WO | WO-2006/039371 | A2 | 4/2006 |
| WO | WO-2007/032874 | A2 | 3/2007 |
| WO | WO-2007/032878 | A2 | 3/2007 |
| WO | WO-2007/146264 | A2 | 12/2007 |

OTHER PUBLICATIONS

"U.S. Appl. No. 11/664,180, Non Final Office Action mailed Feb. 18, 2011", 11 pgs.

"U.S. Appl. No. 11/664,180, Non-Final Office Action mailed Mar. 15, 2010", 9 pgs.

"U.S. Appl. No. 11/664,180, Non-Final Office Action mailed Sep. 18, 2009", 8 pgs.

"U.S. Appl. No. 11/664,180, Preliminary Amendment filed Mar. 29, 2007", 3 pgs.

"U.S. Appl. No. 11/664,180, Response filed Jan. 15, 2010 to Non Final Office Action mailed Sep. 18, 2009", 8 pgs.

"U.S. Appl. No. 11/664,180, Response filed Jan. 26, 2011 to Final Office Action mailed Oct. 26, 2010", 13 pgs.

"U.S. Appl. No. 11/664,180, Response filed Aug. 13, 2010 to Non Final Office Action mailed Mar. 15, 2010", 6 pgs.

"U.S. Appl. No. 11/664,180, Supplemental Preliminary Amendment filed May 18, 2009", 6 pgs.

"U.S. Appl. No. 11/664,185, Final Office Action mailed Jun. 17, 2010", 12 pgs.

"U.S. Appl. No. 11/664,185, Non-Final Office Action mailed Sep. 28, 2009", 9 pgs.

"U.S. Appl. No. 11/664,185, Notice of Allowance mailed Sep. 7, 2010", 7 pgs.

"U.S. Appl. No. 11/664,185, Preliminary Amendment filed Mar. 29, 2009", 3 pgs.

"U.S. Appl. No. 11/664,185, Response filed Feb. 26, 2010 to Non Final Office Action mailed Sep. 28, 2009", 8 pgs.

"U.S. Appl. No. 11/664,185, Response filed Aug. 17, 2010 to Final Office Action mailed Jun. 17, 2010", 11 pgs.

"U.S. Appl. No. 11/664,185, Supplemental Preliminary Amendment filed Apr. 21, 2009", 6 pgs.

"U.S. Appl. No. 11/664,400, Non Final Office Action mailed Feb. 2, 2011", 13 pgs.

"U.S. Appl. No. 11/664,400, Preliminary Amendment filed Mar. 30, 2007", 3 pgs.

"U.S. Appl. No. 11/664,400, Response filed Dec. 17, 2010 to Restriction Requirement mailed Sep. 17, 2010", 6 pgs.

"U.S. Appl. No. 11/664,400, Restriction Requirement mailed Sep. 17, 2010", 9 pgs.

"U.S. Appl. No. 11/664,400, Supplemental Preliminary Amendment filed May 18, 2009", 6 pgs.

"U.S. Appl. No. 11/664,440, Final Office Action mailed May 27, 2010", 12 pgs.

(56) References Cited

OTHER PUBLICATIONS

"U.S. Appl. No. 11/664,440, Non-Final Office Action mailed Jun. 1, 2009", 11 pgs.
"U.S. Appl. No. 11/664,440, Preliminary Amendment mailed Mar. 30, 2007", 3 pgs.
"U.S. Appl. No. 11/664,440, Response filed Jun. 29, 2009 to Non Final Office Action mailed Jun. 1, 2009", 13 pgs.
"U.S. Appl. No. 11/664,440, Response filed Nov. 29, 2010 to Final Office Action mailed May 27, 2010", 9 pgs.
"U.S. Appl. No. 11/664,440, Supplemental Preliminary Amendment filed Apr. 21, 2009" 5 pgs.
"U.S. Appl. No. 12/066,029, Non Final Office Action mailed Dec. 21, 2010", 6 pgs.
"U.S. Appl. No. 12/066,029, Response filed Mar. 21, 2011 to Non Final Office Action mailed Dec. 21, 2010", 9 pgs.
"U.S. Appl. No. 11/664,180, Final Office Action mailed Oct. 26, 2010", 9 pgs.
"Australian Application Serial No. 2005292062, Subsequent Examiners Report mailed Jun. 25, 2009", 3 pgs.
"Australian Application Serial No. 2005292133, Office Action mailed Apr. 30, 2009", 2 pgs.
"U.S. Appl. No. 11/664,180, Response filed Jul. 18, 2011 to Non Final Office Action mailed Feb. 18, 2011", 9 pgs.
"U.S. Appl. No. 11/664,440, Non Final Office Action mailed May 2, 2011", 8 pgs.
"U.S. Appl. No. 12/066,029, Notice of Allowance mailed Jun. 23, 2011", 13 pgs.
"U.S. Appl. No. 12/065,694, Non Final Office Action mailed Sep. 20, 2011", 11 pgs.
"U.S. Appl. No. 11/664,440 Response Filed Oct. 3, 2011 to Non-Final Office Action mailed May 2, 2011", 11 pgs.
"U.S. Appl. No. 11/664,180, Final Office Action mailed Nov. 22, 2011", 11 pgs.
"Australian Application Serial No. 2010202781, First Examiner Report maiied Nov. 14, 2011", 3 pgs.
"Application No. 2005292133, Examiner Report Mailed Dec. 9, 2008", 2 pgs.
"Australian Application Serial No. 2005292062, Examiner's First Report mailed Jun. 24, 2008", 3 pgs.
"Australian Application Serial No. 2005292085, Examiner's First Report mailed Jul. 18, 2008", 2 pgs.
"Australian Application Serial No. 2005292085, Response filed Sep. 3, 2008 to Examiner's First Report mailed Jul. 18, 2008", 12 pgs.
"Australian Application Serial No. 2005292264, Examiner's First Report mailed Jun. 19, 2008", 2 pgs.
"International Application Serial No. PCT/US05/34545, International Search Report mailed Feb. 22, 2006", 3 pgs.
"International Application Serial No. PCT/US05/34545, Written Opinion mailed Feb. 22, 2006", 4 pgs.
"International Application Serial No. PCT/US05/34773, International Search Report mailed Apr. 28, 2006", 2 pgs.
"International Application Serial No. PCT/US05/34773, Written Opinion mailed Apr. 28, 2006", 5 pgs.
"International Application Serial No. PCT/US05/34847, International Search Report mailed Mar. 8, 2006", 2 pgs.
"International Application Serial No. PCT/US05/34847, Written Opinion mailed Mar. 8, 2006", 6 pgs.
"International Application Serial No. PCT/US05/34939, International Search Report mailed Mar. 28, 2006", 2 pgs.
International Application Serial No. PCT/US05/34939, Written Opinion mailed Mar. 28, 2006, 6 pgs.
"International Application Serial No. PCT/US2007/013742, International Search Report mailed Sep. 2, 2008", 2 pgs.
"International Application Serial No. PCT/US2007/013742, Written Opinion mailed Sep. 2, 2008", 4 pgs.
"Project Entropia Interview", [online]. © 1996-2006, IGN Entertainment, Inc . . . [retrieved Feb. 24, 2006]. Retrieved from the Internet: <URL: http://www.pc.ign.com/articles/095/095373p1.html>, (May 31, 2001), 3 pgs.
Campbell, F., "Project Entropia Interview", [online]. Dec. 18, 2002, Gameguru Mania—Gaming News. [archived Dec. 30, 2012]. Retrieved from the Internet <URL: http://www.ggmania.com/full.php3?show=5493>, 7 pgs.
"U.S. Appl. No. 11/644,440, Final Office Action mailed Feb. 27, 2012", 9 pgs.
"U.S. Appl. No. 11/664,180, Examiner Interview Summary mailed Mar. 9, 2012", 3 pgs.
"U.S. Appl. No. 12/065,694, Preliminary Amendment filed Mar. 4, 2008", 3 pgs.
"U.S. Appl. No. 12/065,694, Response filed Jan. 20, 2012 to Non Final Office Action mailed Sep. 20, 2011", 9 pgs.
"U.S. Appl. No. 11/664,180, Examiner Interview Summary mailed Jun. 7, 2012", 2 pgs.
"U.S. Appl. No. 11/664,180, Non Final Office Action mailed Jul. 18, 2012", 11 pgs.
"U.S. Appl. No. 11/664,180, Response filed May 21, 2012 to Final Office Action mailed Nov. 22, 2011", 8 pgs.
"U.S. Appl. No. 11/664,440 , Response filed Apr. 27, 2012 to Final Office Action mailed Feb. 27, 2012", 13 pgs.
"U.S. Appl. No. 11/664,440, Advisory Action mailed May 25, 2012", 3 pgs.
"U.S. Appl. No. 12/065,694, Final Office Action mailed Aug. 22, 2012", 8 pgs.
"International Application Serial No. PCT/US2006/033139, International Preliminary Report on Patentability mailed Jul. 29, 2008", 5 pgs.
"International Application Serial No. PCT/US2006/033139, Written Opinion mailed Mar. 28, 2007", 5 pgs.
"International Application Serial No. PCT/US2007/013742, International Preliminary Report on Patentability mailed Jan. 4, 2009", 12 pgs.

* cited by examiner

FIG. 6D
618
616
612
3X
100
SHOOT
SHOTS
LEFT
100
BONUS
RIGHT LANE
MIDDLE LANE
LEFT LANE
610
610
610

WAGERING MACHINES HAVING THREE DIMENSIONAL GAME SEGMENTS

RELATED APPLICATIONS

This patent application is a U.S. National Stage Filing under 35 U.S.C. 371 from International Patent Application Serial No. PCT/US2007/013742, filed Jun. 12, 2007, and published on Dec. 21, 2007, as WO 2007/146264 A2 and republished as WO 2007/146264 A3, which claims the priority benefit of U.S. Provisional Patent Application Ser. No. 60/804,573 filed Jun. 12, 2006 and entitled "WAGERING GAME MACHINES HAVING THREE DIMENSIONAL GAME SEGMENTS", and to U.S. Provisional Patent Application Ser. No. 60/826,822 filed Sep. 25, 2006 and entitled "WAGERING GAME MACHINES HAVING THREE DIMENSIONAL GAME SEGMENTS", and to U.S. Provisional Patent Application Ser. No. 60/916,514 filed May 7, 2007 and entitled "WAGERING GAME MACHINES HAVING THREE DIMENSIONAL GAME SEGMENTS", the contents of which are incorporated herein by reference in their entirety.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright © 2005-2007, WMS Gaming Inc. All Rights Reserved.

FIELD

The embodiments relate generally to wagering game machines and more particularly to presenting three-dimensional wagering game segments on wagering game machines.

BACKGROUND

Wagering game machine makers continually provide new and entertaining games. One way of increasing entertainment value associated with casino-style wagering games (e.g., video slots, video poker, video blackjack, and the like) includes offering a variety of base games and bonus events. However, despite the variety of base games and bonus events, players often lose interest in repetitive wagering game content. In order to maintain player interest, wagering game machine makers frequently update wagering game content with new game themes, game settings, bonus events, game software, and other electronic data.

DETAILED DESCRIPTION

Figure 1:
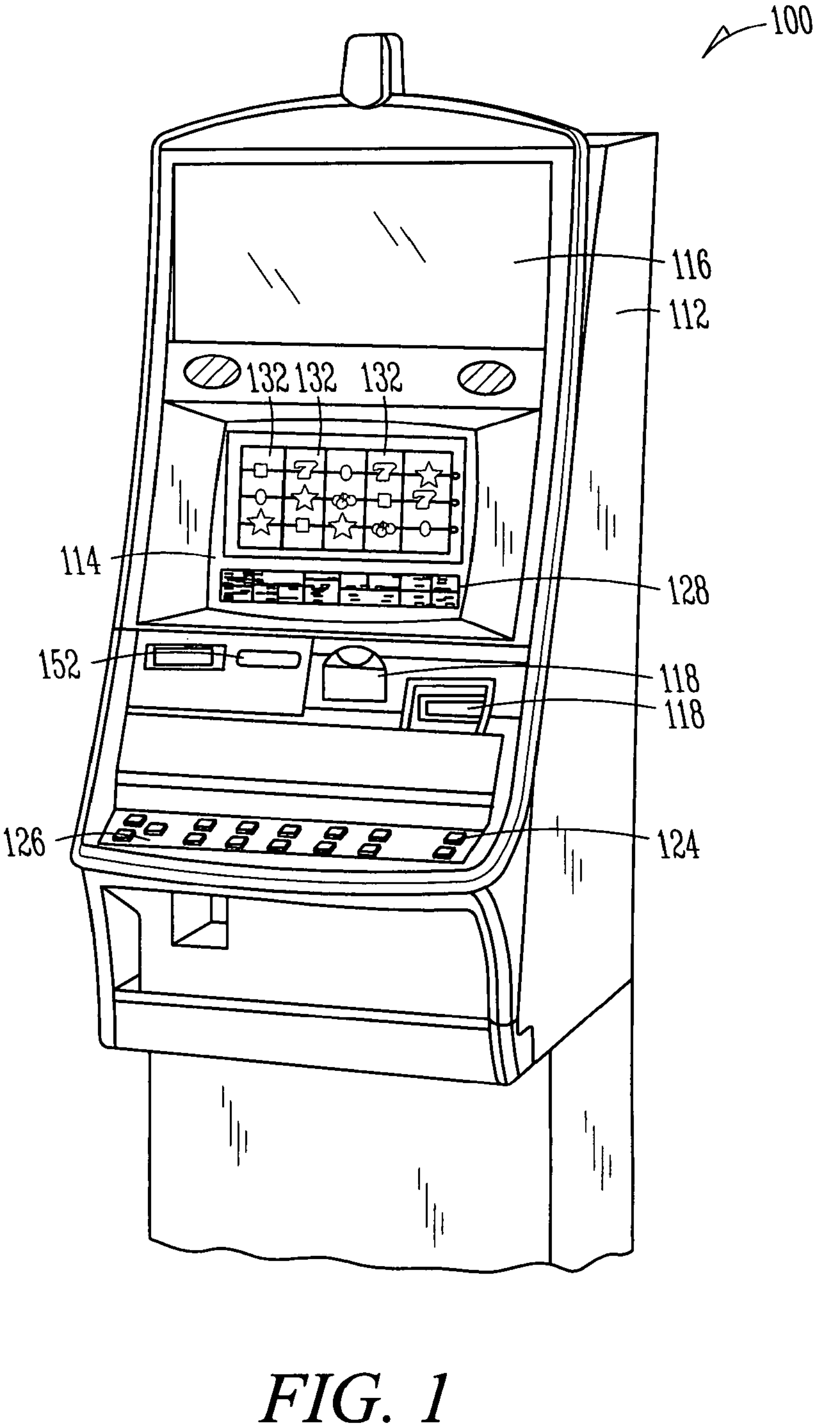
FIG. 1 is a perspective view of a wagering game machine, according to example embodiments of the invention.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The description of the various embodiments is to be construed as exemplary only and does not describe every possible instance of the invention. Numerous alternatives could be implemented, using combinations of current or future technologies, which would still fall within the scope of the claims. The following detailed description is, therefore, not to be taken in a limiting sense, and the scope of the present invention is defined only by the appended claims.

In general, the embodiments of the invention provide for management of portable wagering game machines, including determining whether the portable wagering game machine is authenticated and authorized to play wagering games, whether an authenticated and authorized user is currently using the portable wagering game machine, and whether the portable wagering game machine is in a location where wagering is allowed, or where a particular style of wagering is allowed.

Example Wagering Game Machine

FIG. 1 is a perspective view of a wagering game machine, according to example embodiments of the invention. Referring to FIG. 1, a wagering game machine 100 is used in gaming establishments, such as casinos. According to embodiments, the wagering game machine 100 can be any type of wagering game machine and can have varying structures and methods of operation. For example, the wagering game machine 100 can be an electromechanical wagering game machine configured to play mechanical slots, or it can be an electronic wagering game machine configured to play video casino games, such as blackjack, slots, keno, poker, blackjack, roulette, etc.

The wagering game machine 100 comprises a housing 112 and includes input devices, including value input devices 118 and a player input device 124. For output, the wagering game machine 100 includes a primary display 114 for displaying information about a basic wagering game. The primary display 114 can also display information about a bonus wagering game and a progressive wagering game. The wagering game machine 100 also includes a secondary display 116 for displaying wagering game events, wagering game outcomes, and/or signage information. While some components of the wagering game machine 100 are described herein, numerous other elements can exist and can be used in any number or combination to create varying forms of the wagering game machine 100.

The value input devices 118 can take any suitable form and can be located on the front of the housing 112. The value input devices 118 can receive currency and/or credits inserted by a player. The value input devices 118 can include coin acceptors for receiving coin currency and bill acceptors for receiving paper currency. Furthermore, the value input devices 118 can include ticket readers or barcode scanners for reading information stored on vouchers, cards, or other tangible portable storage devices. The vouchers or cards can authorize access to central accounts, which can transfer money to the wagering game machine 100.

The player input device 124 comprises a plurality of push buttons on a button panel 126 for operating the wagering game machine 100. In addition, or alternatively, the player input device 124 can comprise a touch screen 128 mounted over the primary display 114 and/or secondary display 116.

The various components of the wagering game machine 100 can be connected directly to, or contained within, the housing 112. Alternatively, some of the wagering game machine's components can be located outside of the housing 112, while being communicatively coupled with the wagering game machine 100 using any suitable wired or wireless communication technology.

The operation of the basic wagering game can be displayed to the player on the primary display 114. The primary display 114 can also display a bonus game associated with the basic wagering game. The primary display 114 can include a cathode ray tube (CRT), a high resolution liquid crystal display (LCD), a plasma display, light emitting diodes (LEDs), or any other type of display suitable for use in the wagering game machine 100. Alternatively, the primary display 114 can include a number of mechanical reels to display the outcome. In FIG. 1, the wagering game machine 100 is an "upright" version in which the primary display 114 is oriented vertically relative to the player. Alternatively, the wagering game machine can be a "slant-top" version in which the primary display 114 is slanted at about a thirty-degree angle toward the player of the wagering game machine 100. In yet another embodiment, the wagering game machine 100 can exhibit any suitable form factor, such as a free standing model, bartop model, mobile handheld model, or workstation console model. Further, in some embodiments, the wagering game machine 100 may be include an attached chair assembly, and may include audio speakers designed to provide an enhanced audio environment. For example, a "surround sound" system may be included as part of the wagering game machine and may be integrated with the attached chair.

A player begins playing a basic wagering game by making a wager via the value input device 118. The player can initiate play by using the player input device's buttons or touch screen 128. The basic game can include arranging a plurality of symbols along a payline 132, which indicates one or more outcomes of the basic game. Such outcomes can be randomly selected in response to player input. At least one of the outcomes, which can include any variation or combination of symbols, can trigger a bonus game.

In some embodiments, the wagering game machine 100 can also include an information reader 152, which can include a card reader, ticket reader, bar code scanner, RFID transceiver, or computer readable storage medium interface. In some embodiments, the information reader 152 can be used to award complimentary services, restore game assets, track player habits, etc.

Example Portable Wagering Game Machine

Figure 2:
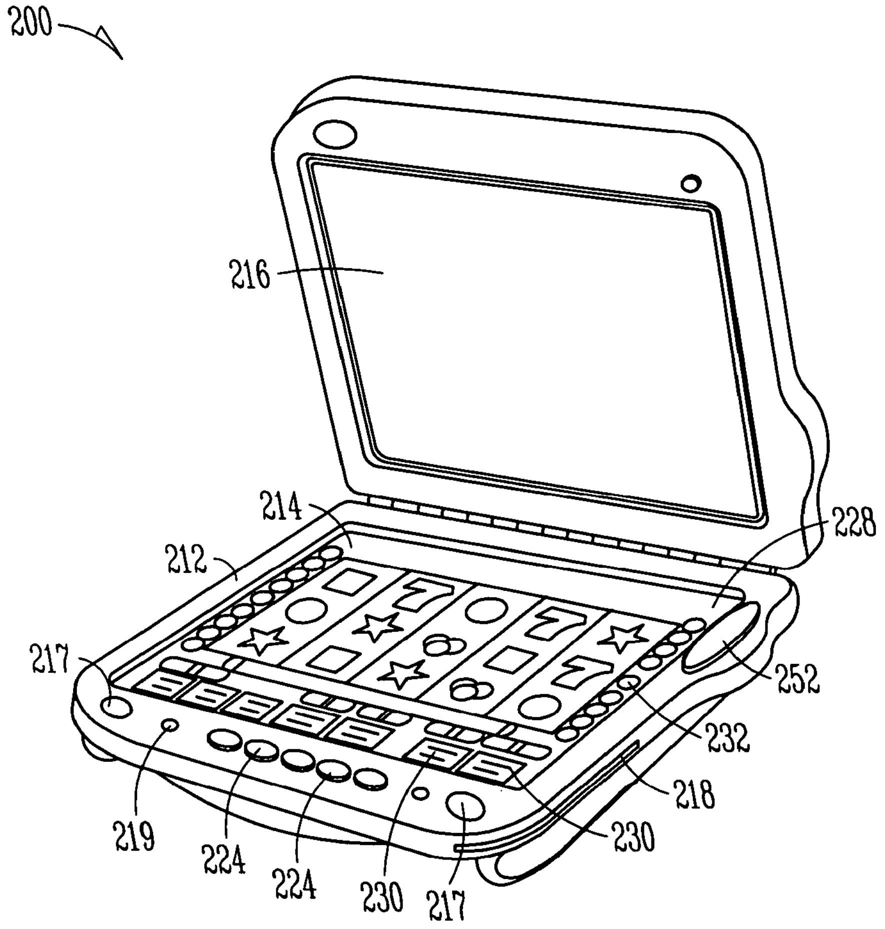
FIG. 2 is a perspective view of a portable wagering game machine according to an example embodiment.

FIG. 2 shows an example embodiment of a portable wagering game machine 200. The portable wagering game machine 200 can include any suitable electronic handheld or mobile device configured to play a video casino game such as blackjack, slots, keno, poker, blackjack, and roulette. The wagering game machine 200 comprises a housing 212 and includes input devices, including a value input device 218 and a player input device 224. For output, the wagering game machine 200 includes a primary display 214, and may include a secondary display 216, one or more speakers 217, one or more player-accessible ports 219 (e.g., an audio output jack for headphones, a video headset jack, etc.), and other conventional I/O devices and ports, which may or may not be player-accessible. In the embodiment depicted in FIG. 2, the wagering game machine 200 includes a secondary display 216 that is rotatable relative to the primary display 214. The optional secondary display 216 can be fixed, movable, and/or detachable/attachable relative to the primary display 214. Either the primary display 214 and/or secondary display 216 can be configured to display any aspect of a non-wagering game, wagering game, secondary game, bonus game, progressive wagering game, group game, shared-experience game or event, game event, game outcome, scrolling information, text messaging, emails, alerts or announcements, broadcast information, subscription information, and wagering game machine status.

The player-accessible value input device 218 can comprise, for example, a slot located on the front, side, or top of the casing 212 configured to receive credit from a stored-value card (e.g., casino card, smart card, debit card, credit card, etc.) inserted by a player. The player-accessible value input device 218 can also comprise a sensor (e.g., an RF sensor) configured to sense a signal (e.g., an RF signal) output by a transmitter (e.g., an RF transmitter) carried by a player. The player-accessible value input device 218 can also or alternatively include a ticket reader, or barcode scanner, for reading information stored on a credit ticket, a card, or other tangible portable credit or funds storage device. The credit ticket or card can also authorize access to a central account, which can transfer monetary value to the wagering game machine 200.

Still other player-accessible value input devices 218 can require the use of touch keys 230 on the touch-screen display (e.g., primary display 214 and/or secondary display 216) or player input devices 224. Upon entry of player identification information and, preferably, secondary authorization information (e.g., a password, PIN number, stored value card number, predefined key sequences, etc.), the player can be permitted to access a player's account. As one potential optional security feature, the wagering game machine 200 can be configured to permit a player to only access an account the player has specifically set up for the wagering game machine 200. Other conventional security features can also be utilized to, for example, prevent unauthorized access to a player's account, to minimize an impact of any unauthorized access to a player's account, or to prevent unauthorized access to any personal information or funds temporarily stored on the wagering game machine 200.

The player-accessible value input device 218 can itself comprise or utilize a biometric player information reader which permits the player to access available funds on a player's account, either alone or in combination with another of the aforementioned player-accessible value input devices 218. In an embodiment wherein the player-accessible value input device 218 comprises a biometric player information reader, transactions such as an input of value to the wagering game machine 210, a transfer of value from one player account or source to an account associated with the wagering game machine 200, or the execution of another transaction, for example, could all be authorized by a biometric reading, which could comprise a plurality of biometric readings, from the biometric device.

Alternatively, to enhance security, a transaction can be optionally enabled only by a two-step process in which a secondary source confirms the identity indicated by a primary source. For example, a player-accessible value input device 218 comprising a biometric player information reader can require a confirmatory entry from another biometric player information reader 252, or from another source, such as a credit card, debit card, player ID card, fob key, PIN number, password, hotel room key, etc. Thus, a transaction can be enabled by, for example, a combination of the personal identification input (e.g., biometric input) with a secret PIN number, or a combination of a biometric input with an authentication fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 218 can be provided remotely from the wagering game machine 210.

The player input device 224 may include a plurality of push buttons on a button panel for operating the wagering game machine 200. In addition, or alternatively, the player input device 224 can comprise a touch screen mounted to the primary display 214 and/or secondary display 216. In one aspect, the touch screen is matched to a display screen having one or more selectable touch keys 230 selectable by a user's touching of the associated area of the screen using a finger or a tool, such as a stylus pointer. A player enables a desired function either by touching the touch screen at an appropriate touch key 230 or by pressing an appropriate push button on the button panel. The touch keys 230 can be used to implement the same functions as push buttons. Alternatively, the push buttons 226 can provide inputs for one aspect of the operating the game, while the touch keys 230 can allow for input needed for another aspect of the game. The various components of the wagering game machine 200 can be connected directly to, or contained within, the casing 212, as seen in FIG. 2, or can be located outside the casing 212 and connected to the casing 212 via a variety of wired (tethered) or wireless connection methods. Thus, the wagering game machine 200 can comprise a single unit or a plurality of interconnected (e.g., wireless connections) parts which can be arranged to suit a player's preferences.

The operation of the basic wagering game on the wagering game machine 200 is displayed to the player on the primary display 214. The primary display 214 can also display a bonus game associated with the basic wagering game. The primary display 214 preferably takes the form of a high resolution LCD, a plasma display, an LED, or any other type of display suitable for use in the wagering game machine 200. The size of the primary display 214 can vary from, for example, about a 2-3" display to a 15" or 17" display. In at least some embodiments, the primary display 214 is a 7"-10" display. In one embodiment, the size of the primary display can be increased. Optionally, coatings or removable films or sheets can be applied to the display to provide desired characteristics (e.g., anti-scratch, anti-glare, bacterially-resistant and anti-microbial films, etc.). In at least some embodiments, the primary display 214 and/or secondary display 216 can have a 16:9 aspect ratio or other aspect ratio (e.g., 4:3). The primary display 214 and/or secondary display 216 can also each have different resolutions, different color schemes, and different aspect ratios.

A player typically begins play of the basic wagering game on the wagering game machine 200 by making a wager (e.g., via the value input device 218 or an assignment of credits stored on the portable wagering game machine 200 via the touch screen keys 230, player input device 224, or buttons 226) on the wagering game machine 200. In some embodiments, the basic game can comprise a plurality of symbols arranged in an array, and includes at least one payline 232 that indicates one or more outcomes of the basic game. Such outcomes can be randomly selected in response to the wagering input by the player. At least one of the plurality of randomly selected outcomes can be a start-bonus outcome, which can include any variations of symbols or symbol combinations triggering a bonus game.

In some embodiments, the player-accessible value input device 218 of the wagering game machine 200 can double as a player information reader 252 that allows for identification of a player by reading a card with information indicating the player's identity (e.g., reading a player's credit card, player ID card, smart card, etc.). The player information reader 252 can alternatively or also comprise a bar code scanner, RFID transceiver or computer readable storage medium interface. In one embodiment, the player information reader 252 comprises a biometric sensing device.

In some embodiments, a portable wagering game machine 200 can part of a portable wireless communication device, such as a personal digital assistant (PDA), a laptop or portable computer with wireless communication capability, a web tablet, a wireless telephone, a wireless headset, a pager, an instant messaging device, a digital camera, a television, or other device that can receive and/or transmit information wirelessly.

Figure 3:
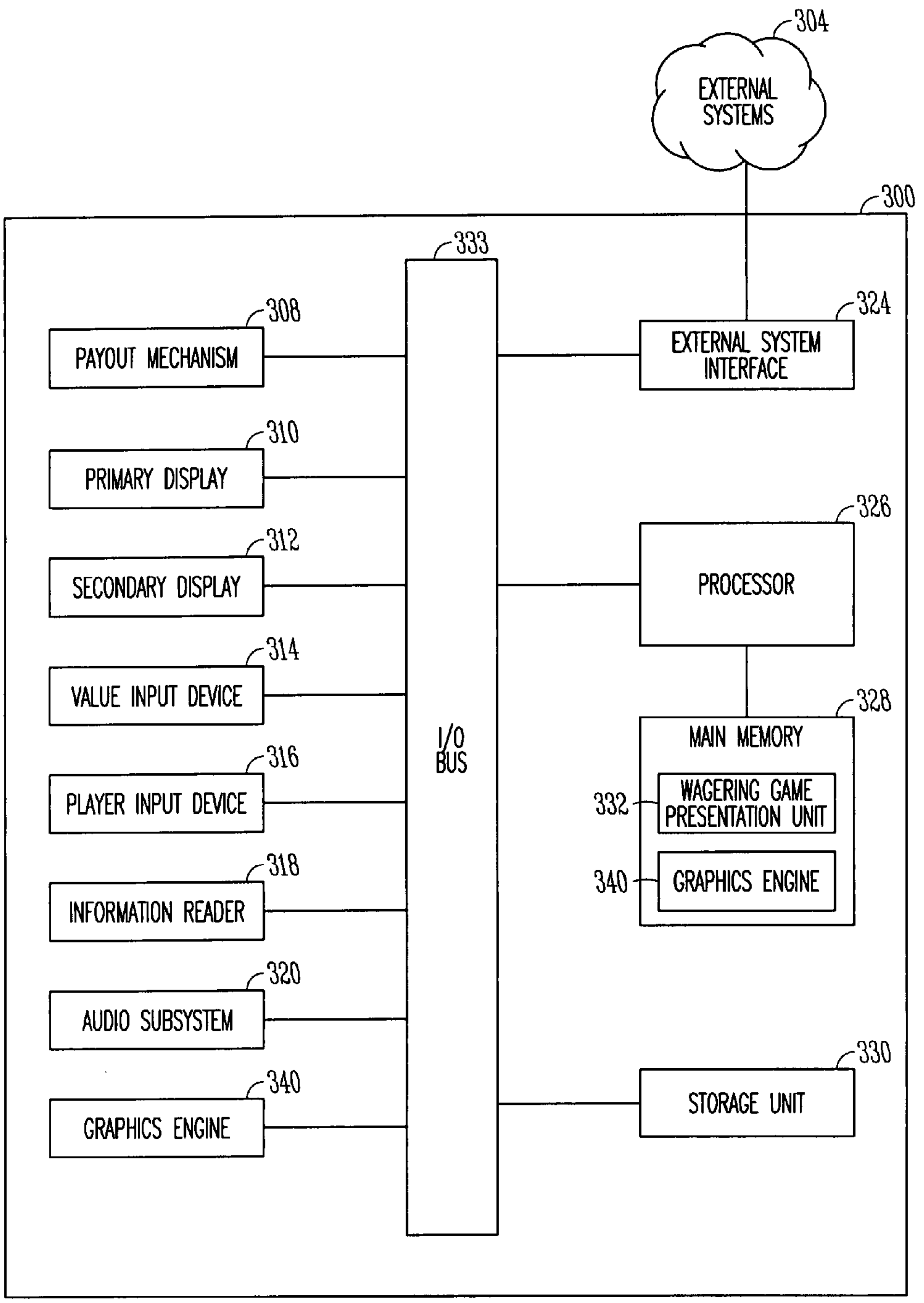
FIG. 3 is a block diagram of an architecture, including a control system, for a wagering game machine according to an example embodiment.

FIG. 3 is a block diagram illustrating an architecture 300, including a control system, for a portable wagering game machine, according to example embodiments of the invention. As shown in FIG. 3, the architecture 300 includes a processor 326 connected to main memory 328, which may include portable wagering game presentation unit 332 and rendering engine 340. In one embodiment, the wagering game presentation unit 332 can present wagering games, such as video poker, video blackjack video slots, video lottery, etc., in whole or in part.

Graphics engine 340 includes components that may be used to provide a real-time three-dimensional rendering of a three-dimensional space based on input data. Various graphics engines are known in the art and may be used in various embodiments of the invention. In some embodiments, the graphics engine comprises a RenderWare graphics engine, available from Criterion Software. As shown on FIG. 3, graphics engine 340 may be implemented in software, hardware, or a combination of software and hardware.

In some embodiments, graphics engine 340 provides a set of one or more components that provide real-time three dimensional computer graphics for a wagering game application or other software running on a wagering game machine. Graphics engine 340 may also be referred to as a game engine. In some embodiments, graphics engine 340 provides an underlying set of technologies in an operating system independent manner such that a wagering game may be easily adapted to run on multiple platforms, including various hardware platforms such as stand-alone and portable wagering game machines and various software platforms such as Linux, UNIX, Mac OS X and Microsoft Windows families of operating systems. In some embodiments, graphics engine 340 may include various combinations of one or more components such as a rendering engine ("renderer") for two dimensional or three dimensional graphics, a physics engine and/or components providing collision detection, sound, scripting, animation, artificial intelligence, networking, and scene graphs. A scene graph is generally considered to be an object-oriented representation of a three dimensional game world and is designed for efficient rendering of vast virtual worlds. Thus in various embodiments, a real-time rendering of a three-dimensional model such as a scene graph is provided for a wagering game application or other software operating on a wagering game machine.

The components described above may be implemented in various combinations of software, hardware and/or firmware. Further, while shown as part of a control system 300 for a wagering game machine, graphics engine 340 or portions thereof may reside on systems external to the wagering game machine, such as on a game server.

In some embodiments, the components of graphics engine 340 may be replaced or extended with more specialized components. For example, in particular embodiments, graphics engine 340 may be provided as a series of loosely connected components that can be selectively combined to create a custom graphics engine for a wagering game application.

As noted above, various components may be present in a graphics engine 340. Some graphics engines provide real-time 3D rendering capabilities while other components outside of the graphics engine provide other functionality used by wagering games. These types of graphics engines 340 may be referred to as a "rendering engine," or "3D engine".

In some embodiments, the graphics engine 340 may utilize and be designed substantially in accordance with various versions of a graphics API such as Direct3D or OpenGL which provides a software abstraction of a graphics processing unit or video card. Further, in some embodiments, low-level libraries such as DirectX, SDL (Simple DirectMedia Layer), and OpenAL may also be used in presenting a wagering game in order to assist in providing hardware-independent access to other computer hardware such as input devices (mouse, keyboard, and joystick), network cards, and sound cards.

The processor 326 is also connected to an input/output (I/O) bus 322, which facilitates communication between the wagering game machine's components. The I/O bus 322 may be connected to a payout mechanism 308, primary display 310, secondary display 312, value input device 314, player input device 316, information reader 318, and/or storage unit 330. The player input device 316 can include the value input device 314 to the extent the player input device 316 is used to place wagers. The I/O bus 322 may also be connected to an external system interface 324, which is connected to external systems 304 (e.g., wagering game networks).

Some embodiments of the invention include an audio subsystem 320. Audio subsystem 320 provides audio capabilities to the wagering game machine and may comprise an audio amplifier coupled to speakers or an audio jack, and may further include an audio programming source on a memory such as a CD, DVD, flash memory etc.

In one embodiment, the wagering game machine architecture 300 can include additional peripheral devices and/or more than one of each component shown in FIG. 3. For example, in one embodiment, the wagering game machine architecture 300 can include multiple external system interfaces 324 and multiple processors 326. In one embodiment, any of the components can be integrated or subdivided. Additionally, in one embodiment, the components of the wagering game machine architecture 300 can be interconnected according to any suitable interconnection architecture (e.g., directly connected, hypercube, etc.).

In one embodiment, any of the components of the wagering game machine architecture 300 (e.g., the wagering game presentation unit 332 or portable wagering game management unit) can include hardware, firmware, and/or software for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

In operation, a player may use the portable wagering game machine to activate a play of a wagering game on the machine. Using the available input mechanisms such as value input device 314 or devices coupled through player input device 316, the player may select any variables associated with the wagering game and place his/her wager to purchase a play of the game. In a play of the game, the processor 326 generates at least one random event using a random number generator (RNG) and provides an award to the player for a winning outcome of the random event.

Alternatively, the random event may be generated by a remote computer using an RNG or pooling schema and then transmitted to the wagering game machine. The processor 326 operates the display 114 to represent the random event (s) and outcome(s) in a visual form that can be understood by the player. In some embodiments, a wagering game segment may be triggered based on certain events. For example, a bonus round may be triggered.

Figure 4A:
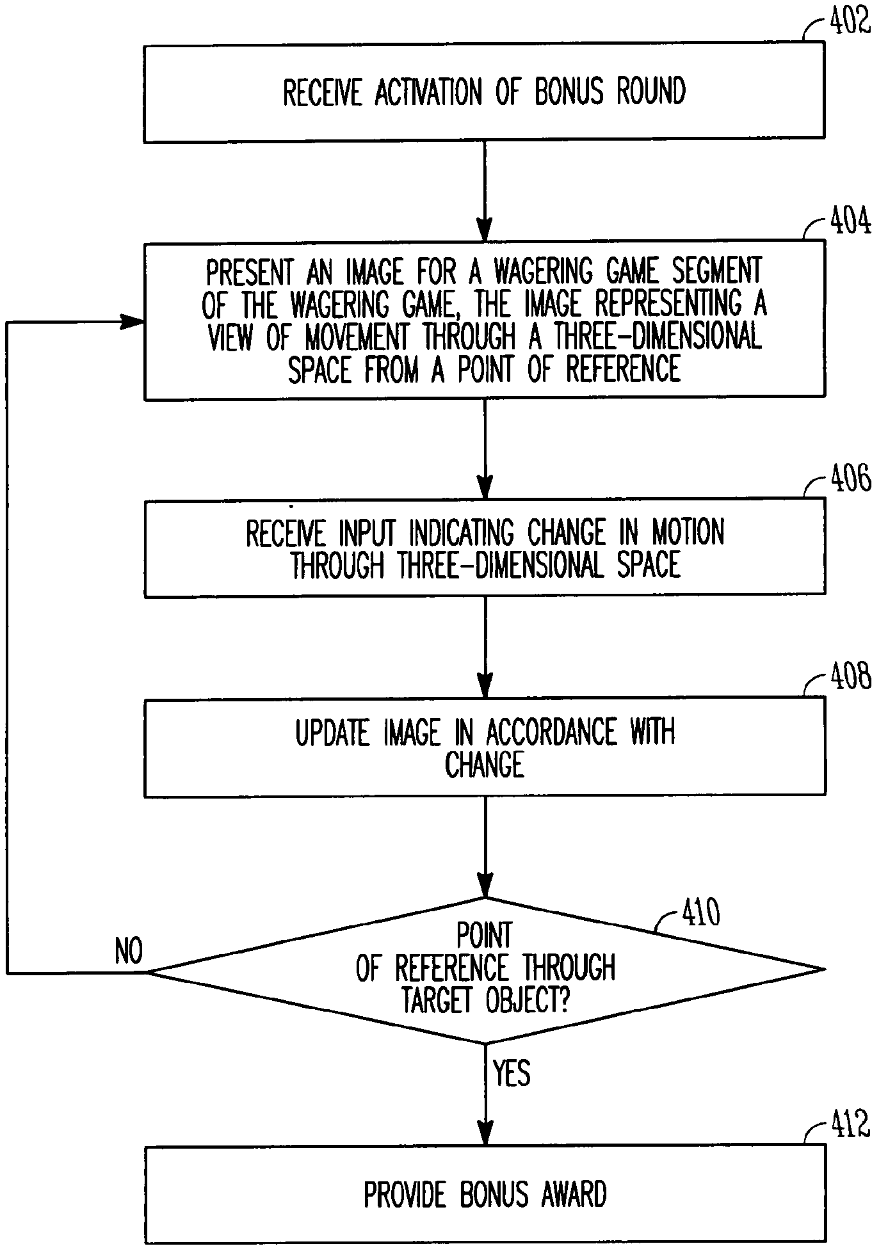
FIGS. 4A and 4B are a flowcharts illustrating methods for providing a display on a wagering game machine according to example embodiments.

FIG. 4A is a flowchart illustrating methods for providing three-dimensional wagering game segments for a wagering game presented on a wagering game machine 100 or portable wagering game machine 200 The methods to be performed by the operating environment constitute computer programs made up of computer-executable instructions. Describing the methods by reference to a flowchart enables one skilled in the art to develop such programs including such instructions to carry out the method on suitable processors for gaming machines (the processor or processors of the computer executing the instructions from computer-readable media). The methods illustrated in FIG. 4 are inclusive of acts that may be taken by an operating environment executing an exemplary embodiment of the invention.

In some embodiments, the method begins at block 402 by receiving an activation of a wagering game segment such as a bonus round. A bonus round may be activated upon the appearance of one or more predetermined symbols on a pay line, at random intervals, or at other times as may be determined by a casino operator.

At block 404, the system proceeds to present an image for a wagering game. In some embodiments, the image represents a continuously updated view of movement through a three-dimensional space from the view of a point of reference as calculated using an input data model and a graphics engine that processes the data model to produce the view. In some embodiments, the image represents a flight of an airplane. In alternative embodiments, the image represents the view of a car driving down one or more lanes of a street. The embodiments are not limited to any particular model.

Additionally, the image may contain graphical objects representing targets or other objects in the scene. In some embodiments, the targets may comprise bonus award amounts or bonus multipliers. In addition, the graphical objects may include graphical elements that are part of the bonus round such as airplanes, cars, or other parts of the scenes provided in a bonus round. The graphical objects may be fixed in the three-dimensional space or they may move through the three-dimensional space.

At block 406, the system receives input indicating a change in motion is to be effected. For example, in some embodiments, a button may be pressed indicating a plane is to bank left, bank right, climb, or dive. In alternative embodiments, a button may be pressed indicating that a car is to change lanes. The input may be received from a button on a button panel, a button icon on a touch screen, or from any other type of input device.

At block 408, the system updates the image in accordance with the input received at block 406. In some embodiments, specific target objects may be displayed in response to the change in movement.

At block 410, the system determines if the point of reference has gone through or moved substantially close to a target object. If not, (i.e. there was a target "miss"), the system returns to block 404 to continue the update of the wagering game segment.

If the point of reference has gone through or passed close enough to a target object (i.e. a target "hit"), at block 412 the system provides a bonus award represented by the target object. As noted above, the bonus award may be a bonus amount or a bonus multiplier. In some embodiments, the bonus multiplier results in multiplying the bonus amount of the next target hit. Additionally, a hit on the target objects may cause the bonus round to be extended, or may cause a different wagering game segment or different phase of the bonus round to occur.

Blocks 404 to 412 may continue until an event occurs that ends the bonus round. For example, the bonus round may expire after a particular amount of time has elapsed, of if a particular target objects is "hit".

Further details regarding methods of presenting a three-dimensional wagering game segment in particular embodiments are provided below in FIGS. 5A-5Q and 6A-6F.

Figure 4B:
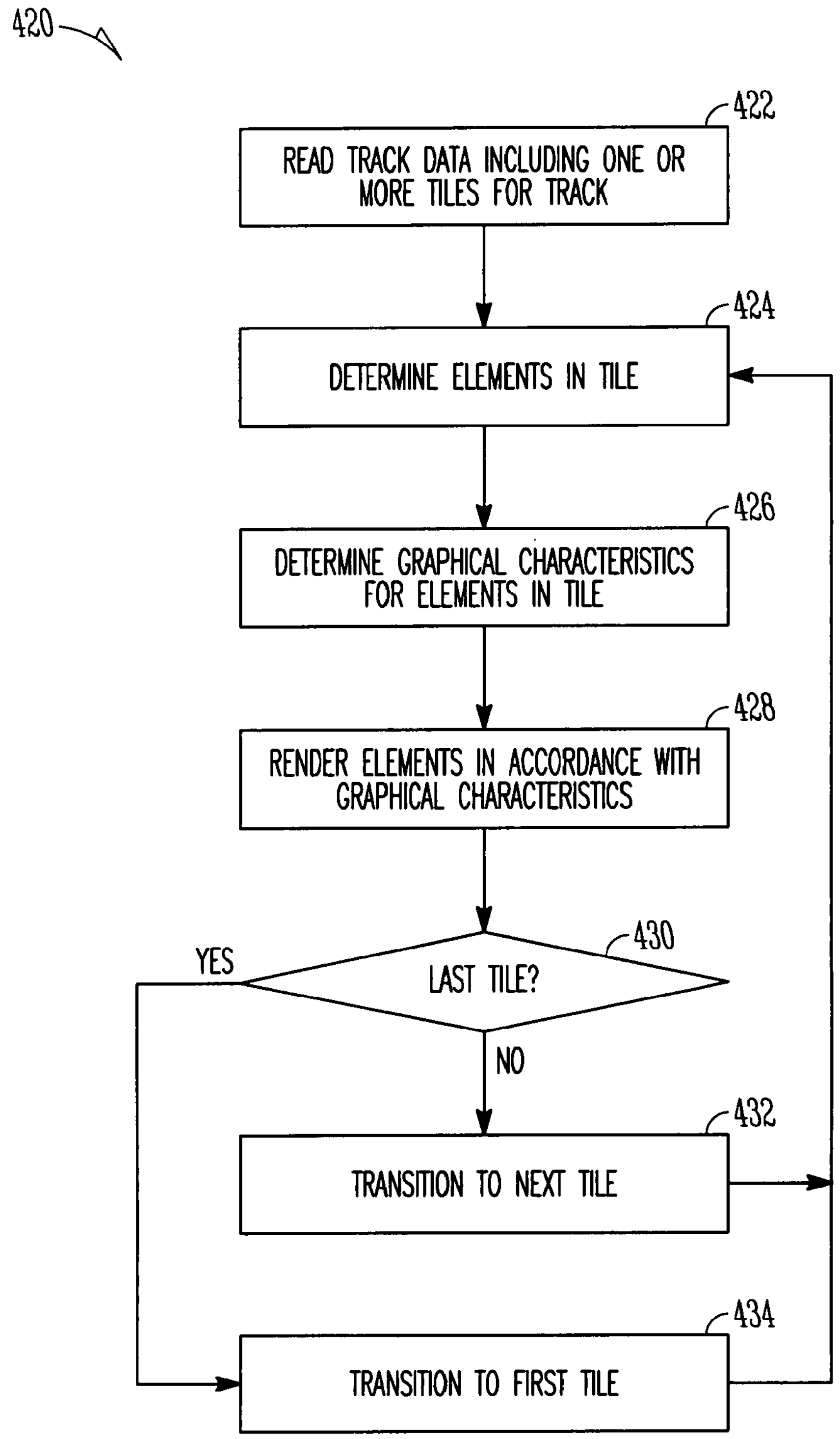

FIG. 4B is a flowchart illustrating further methods 420 for providing three-dimensional wagering game segments for a wagering game presented on a wagering game machine 100 or portable wagering game machine 200. In some embodiments, a method for displaying a three-dimensional wagering game segment begins at block 422 by reading track data for a wagering game segment such as a bonus round. In general the track data includes data representing a series of one or more tiles that define a path through a graphical environment. Thus the track may be used to provide a scripted environment with various degrees of customization or randomization of the environment provided. A graphical object representing a user (e.g. an avatar) or an object under the control of a user (e.g., a car, plane or other vehicle) may move or be moved through the environment. For example, the environment may be a set streets of a city, a cave, an airspace, or any other environment. A car with movements controlled by the user may interact with other cars in the environment, or a plane controlled by the user may be flown through an airspace defined by the track and interact with targets or other places in the environment defined by the track, the tiles of the track, and the elements within a tile.

Figure 4C:
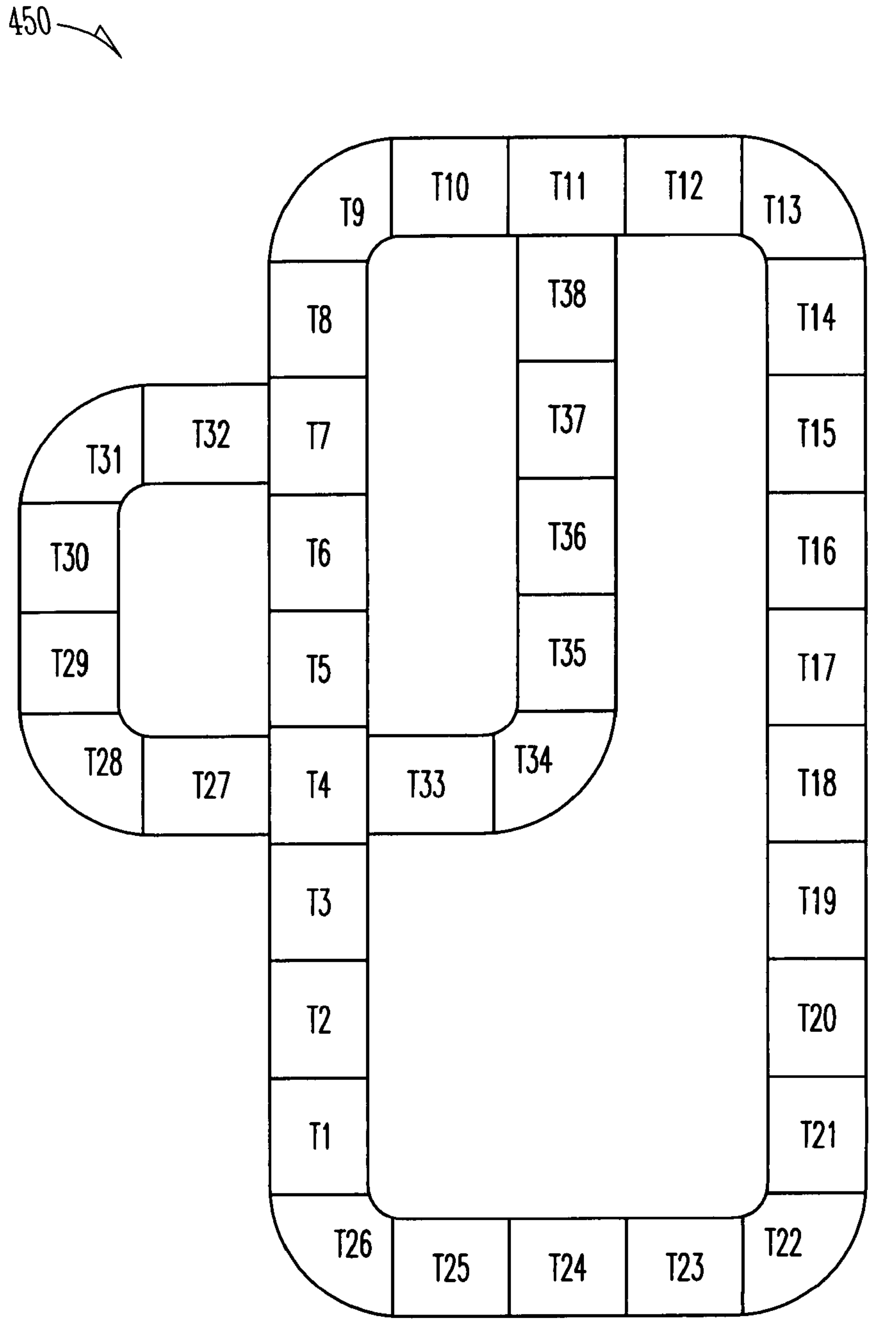
FIG. 4C is a example track having tiles used in embodiments of the invention.

FIG. 4C illustrates an example track 450 having multiples tiles labeled T1-T38. As illustrated in FIG. 4C, the tiles of the track may form a loop (tiles T1-T26) with one or more paths that diverge from the loop and return to the loop (e.g., tiles T27-T32 and tiles T33-T38). It should be noted that track 450 is but one example, other tracks may have more or fewer tiles, and more or fewer paths within the track. Further, the track may comprise a single path of tiles.

Returning to FIG. 4B, the system may determine a starting point in the track. In some embodiments, the starting point may be a predetermined tile (e.g. FIG. 4C, tile T1). In alternative embodiments, the starting point may be a randomly determined tile.

At block 424, the system determines which graphical elements are included for rendering a scene represented by a tile. The graphical elements may include a variety of different elements such as buildings, streets, sky, clouds, planes, people, targets, point indicators, etc. The embodiments are not limited to any particular combination of graphical elements. In some embodiments, the graphical elements that are part of a tile may be predetermined and read from memory when the tile is processed. In alternative embodiments, some of the graphical elements may be randomly determined. For example, bonus points or targets may be generated with random amounts and/or random positioning and placed among the predetermined graphical elements. Further, certain elements such as clouds in a sky or people along a street may be randomly generated while buildings are predetermined. Additionally, the elements generated may be based on external conditions. For example, the system may determine the current weather and simulate that weather when rendering the tile. Similarly, the system may use the current time of day to determining the lighting used to render the tile. Still further, elements that are randomly generated during one pass through the track or portion of a track may be stored such that they reappear in the same tile during a subsequent pass through the track. For example, targets and bonus amounts may be randomly generated and saved such that the same bonus amounts and targets appear the next time the user passes through the tile.

At block 426, the system determines graphical characteristics associated with the tile or for graphical elements associated with a tile. Various characteristics are possible and within the scope of the inventive subject matter. Examples of such characteristics include but are not limited to perspective (first person, third person), camera angle, top view, side view, distance (near view, far view etc.) and lighting intensities and placements. In some embodiments, the graphical characteristics may be predetermined. In alternative embodiments, a player may toggle between two or more sets of characteristics. For example, a player may desire a close-up view of a target in order to assist in hitting or catching the target. Further, the system may automatically toggle between two or more sets of characteristics. For example, the system may provide one view when navigating down a street and automatically provide a close-up view upon turning a corner.

At block 428, the system renders the image associated with a tile in accordance with the elements and graphical characteristics determined at blocks 424 and 426.

As a player controls movement on the track or as the system determines movement on the track, the system may transition to a new tile. For example, a transition may occur if a player turns a corner in a street based environment, or ascends or descends in an airspace based environment. In some embodiments, at block 430 the system determines if it is transitioning from the last tile defined for the track. If not, the system transitions to the next tile at block 432. Otherwise, at block 434 the system transitions from the last tile to the first tile. Thus a track, the tiles within the track, and the graphical elements associated with the tiles may be designed such that an illusion of continuous movement is provided.

In some embodiments, the illusion of continuous movement provided by a looped track may be further enhanced by changes that may occur during subsequent passes through the track. For example, as discussed above, some elements may be randomly generated for a tile such that the appearance will change based on different elements being randomly generated during a subsequent pass through the tile. Further, graphical characteristics such as camera angle, lighting, or positioning may be changed to provide a different look and feel during a subsequent pass through a tile in a track.

Additionally, in some embodiments, the system may save the path a user took through the track in order to provide an "instant replay" feature. The system, either automatically or under the control of a user, may provide different camera angles during the instant replay allowing the user to see different views of the original path through the track. Further, the system may save a path that represents a "best" bonus round (e.g., a bonus round in which the user achieved their best score). The saved path may represent a previous episode of an episodic bonus. The path may be saved on the machine, or it may be saved on a server so that the user may replay the bonus round on a different wagering game machine or on a personal computer.

Similar to saving a path, the system may automatically checkpoint or allow a user to checkpoint a path, e.g., save the current state of the user's path through the track. The user may the return to the checkpointed position within the track and resume where the user left off.

The system may maintain multiple tracks, and the user may be allowed to switch between tracks or may be automatically switched between tracks. For example, in the case of tracks representing an airspace, a user may be flying through mountains on one track and then ascend onto a second track to engage simulated enemy pilots or targets. The tracks may be moving simultaneously and the user may be able to view the second track (e.g. to see above or below the current track).

In some embodiments, the system may provide linear branching, that is, a user may branch from one path on the track to another path only where there is an intersection of paths (e.g. at tiles T4, T7 and T11). Note that although the branches as illustrated in FIG. 4C may appear to be east/west (left/right) or north/south branches, it is not necessary that the branches correspond to such movements, and branches may be up/down or may be in any arbitrary direction.

In some embodiments, the system may provide a "teleportation" feature in which a graphical object under the control of a user may be moved from one tile to a non-adjacent tile, resulting in the illusion of teleportation. Further, the graphical object may be moved from one track to another track thereby providing the illusion of teleportation to a different virtual world.

The description above has generally been provided in the context of moving along a track comprising tiles. However, it should be noted that some embodiments allow the user to stop motion, or reverse motion along the track. For example, a graphical object controlled by the user (car, plane, avatar representing the user etc.) may be stopped while other graphical object in the tiles of the track continue to go by, or the graphical object controlled by the user may be moved backwards along the path previously taken.

In some embodiments, the user may be allowed to leave the track altogether and return at a later point. For example, upon leaving the track, the environment may cease to be generated in a scripted manner and a physics engine may be used to simulate the interaction of objects being displayed. For example, a physics engine may be used to simulate gravity, wind, object motion, and collisions between objects while the user is no longer on the track. Upon returning to the track, the images may be rendered as described above. Various mechanisms may be used to determine that the user should be returned to the track, for example hitting target may return the user to a tile in a track or the expiration of a timer may cause the user to return to a tile in a track.

In some embodiments, a physics engine may be used in conjunction with movement through a track. Thus some aspects of the rendered image may be scripted and other aspects may behave in accordance with the output of the physics engine.

As noted above, the track and the tiles making up the track may be used to script or partially script a bonus round of a wagering game. In some embodiments, a processor or processors controlling the wagering game machine determines the total bonus amount that will be award during the bonus round prior to the display and execution of the bonus round. The targets or objects that appear along the path may be adjusted such that they are forced to total the predetermined bonus amount. Alternatively, the bonus amounts that may be obtained along the path may be randomly generated and a final target or other graphical object may provide a final bonus amount the causes the total to equal the predetermined amount. In further alternative embodiments, the system predetermines which targets or other objects will contribute to the final bonus amount and dynamically changes the amounts associated with the targets or graphical objects such that the amount when totaled equals the predetermined bonus amount.

Figure 5A:
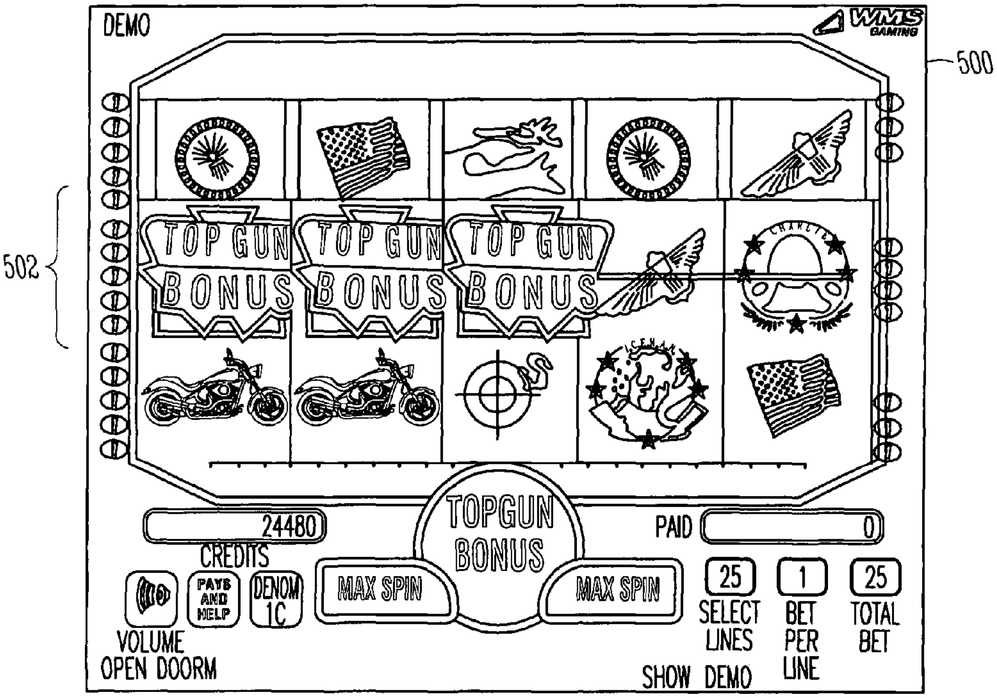
FIGS. 5A-5Q are example screen shots illustrating the operation of an example embodiment of the invention.
Figure 5B:
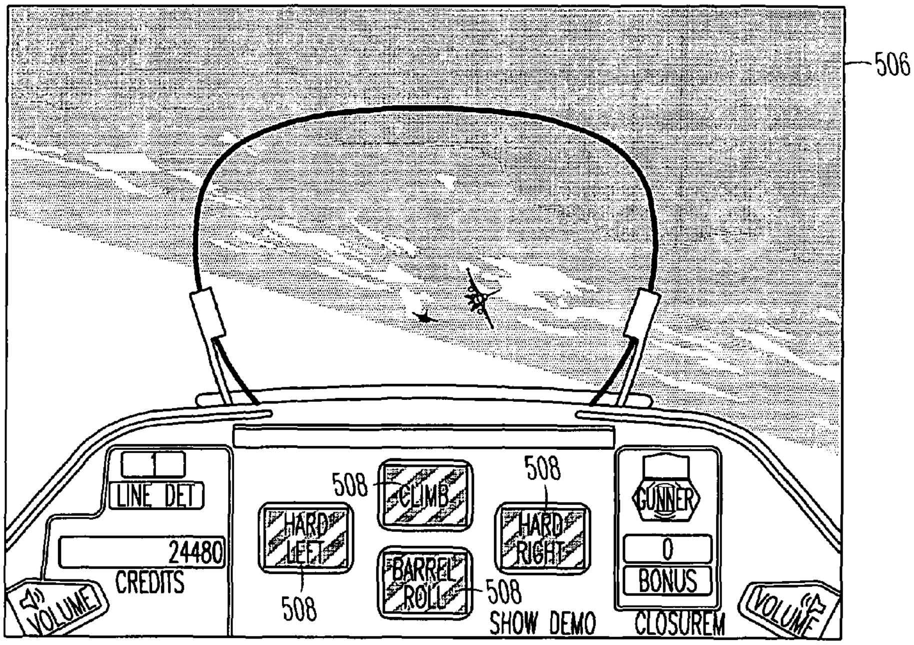
Figure 5C:
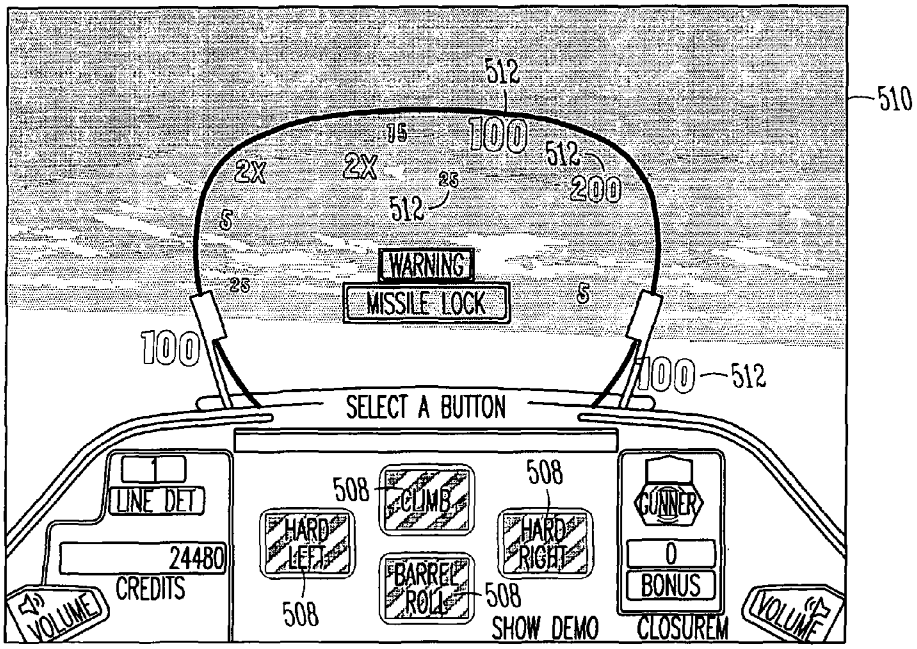
Figure 5D:
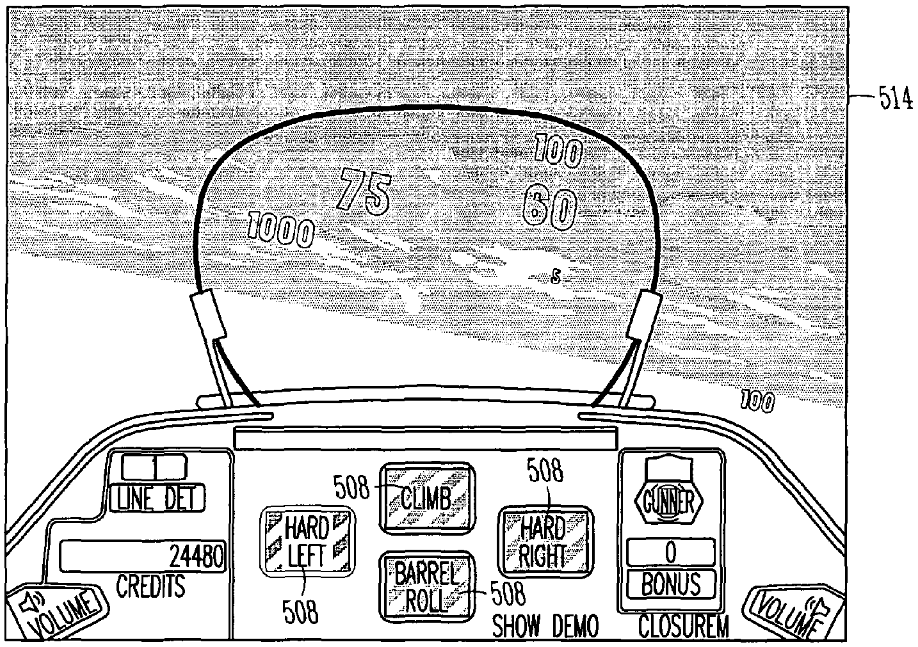
Figure 5E:
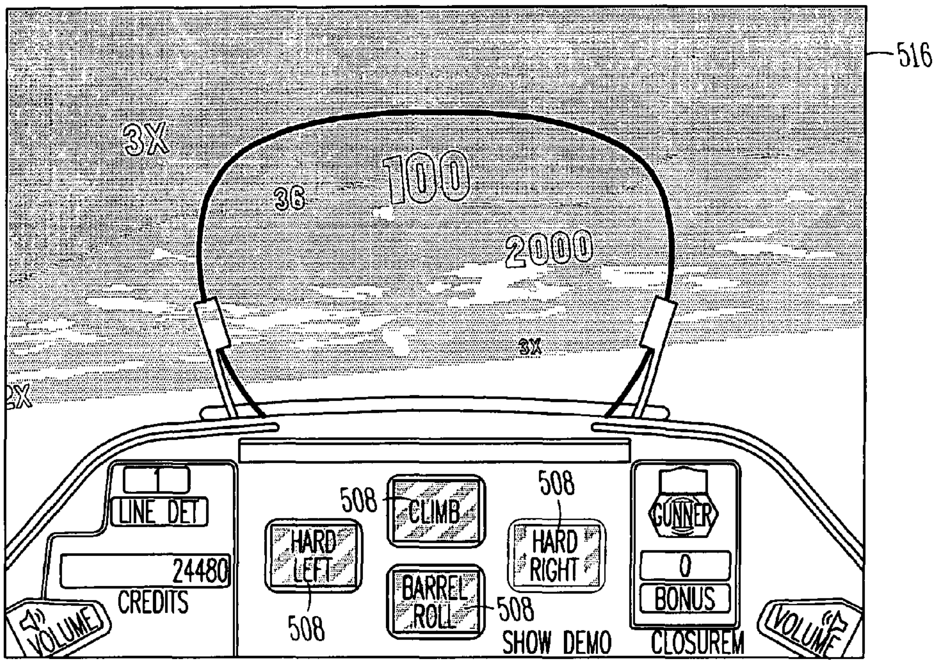
Figure 5F:
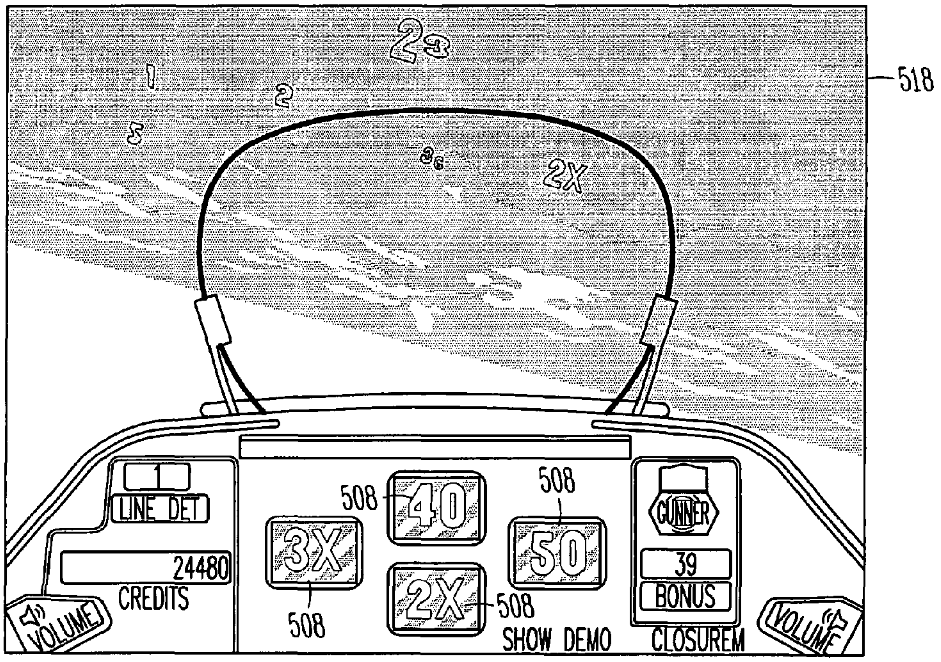
Figure 5G:
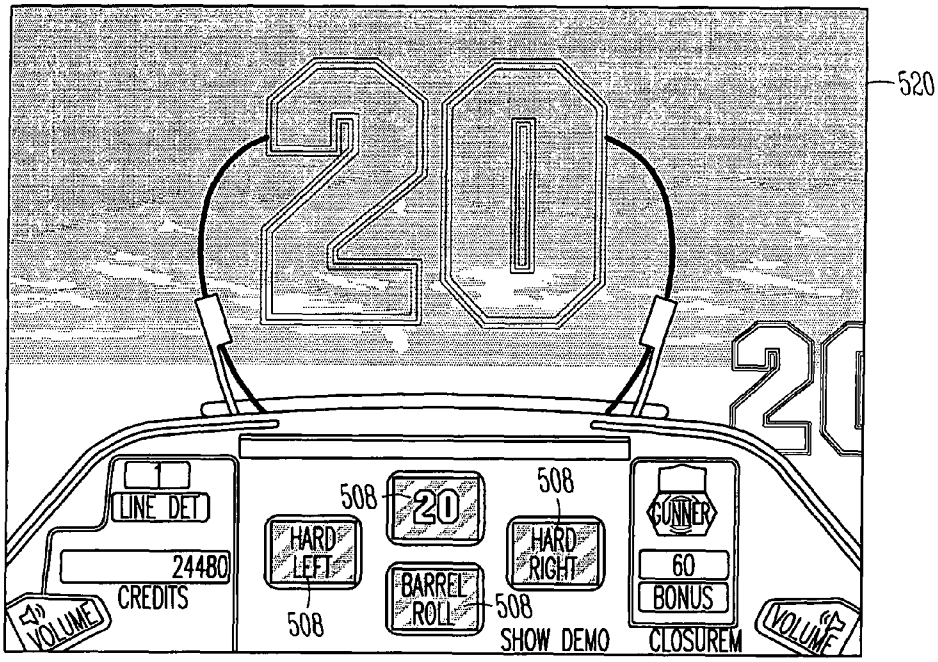
Figure 5H:
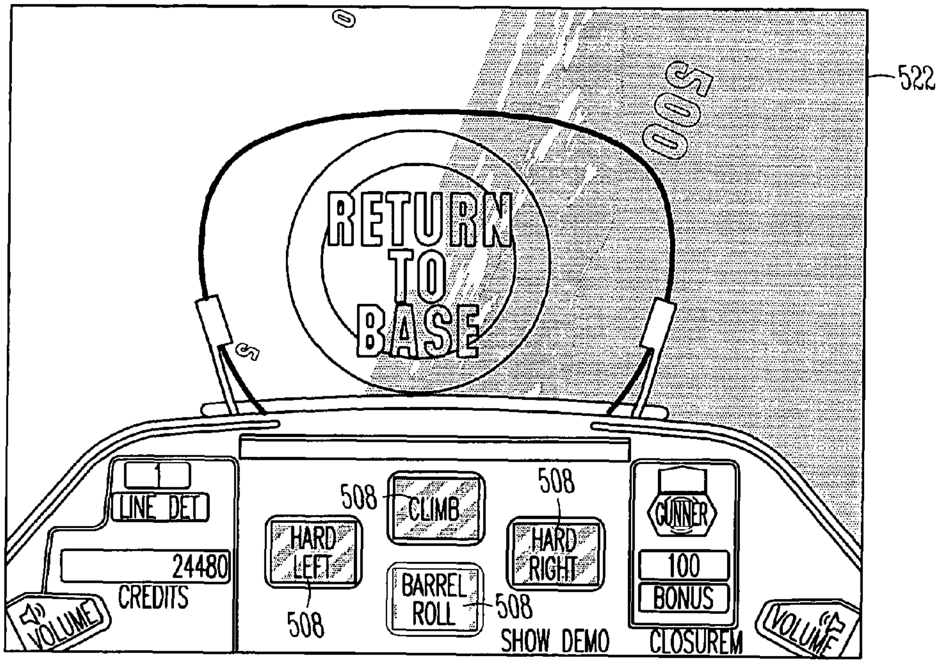
Figure 5I:
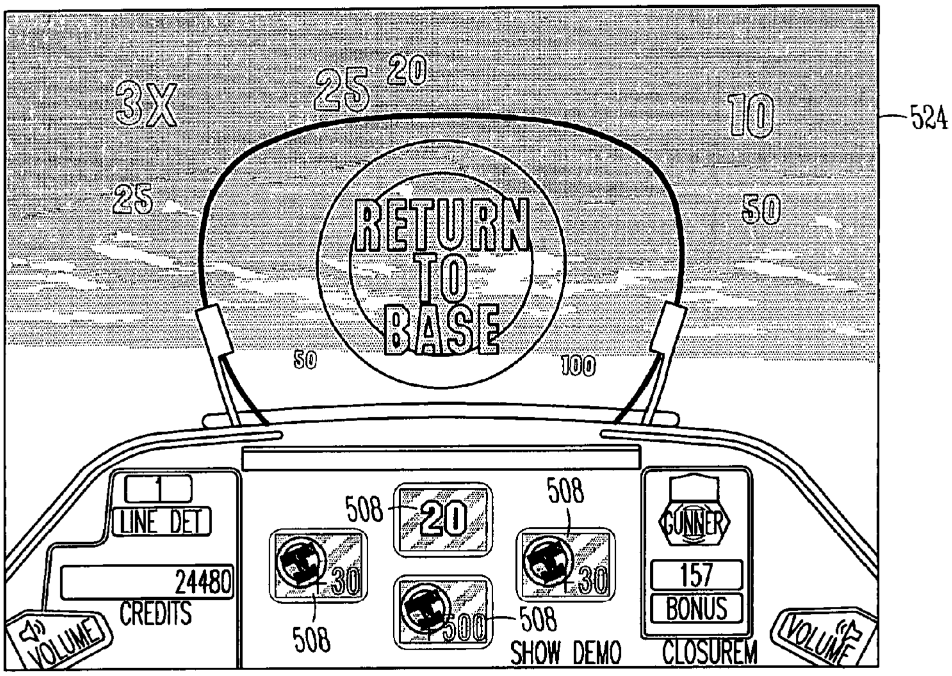
Figure 5J:
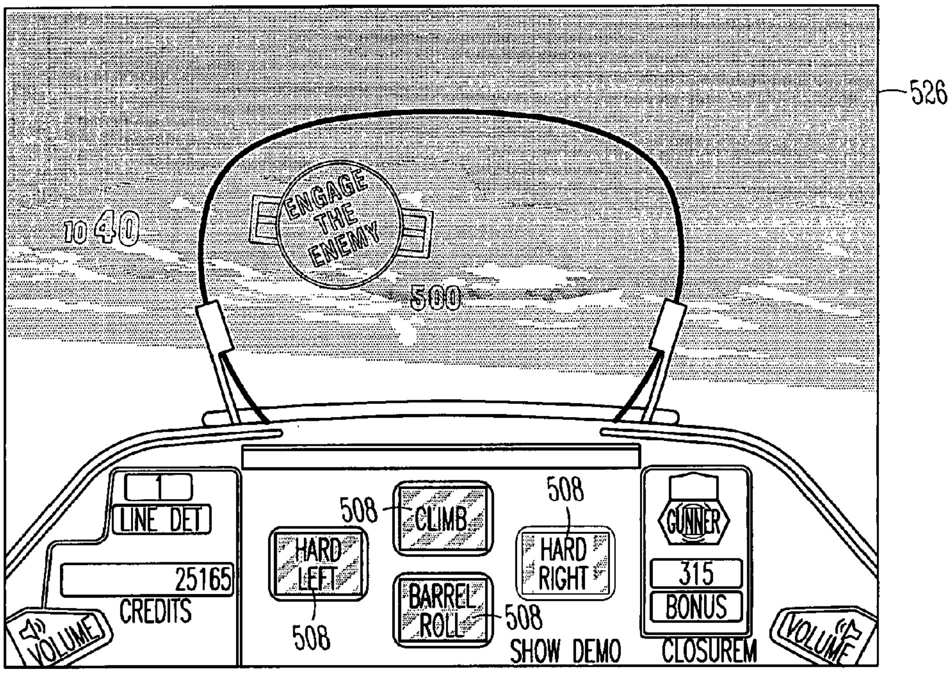
Figure 5K:
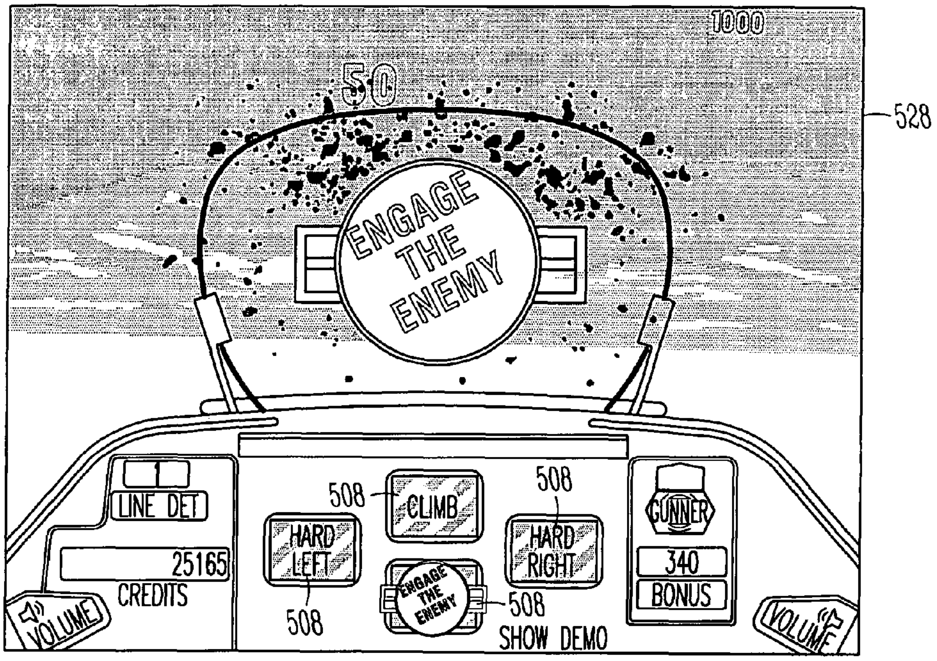
Figure 5L:
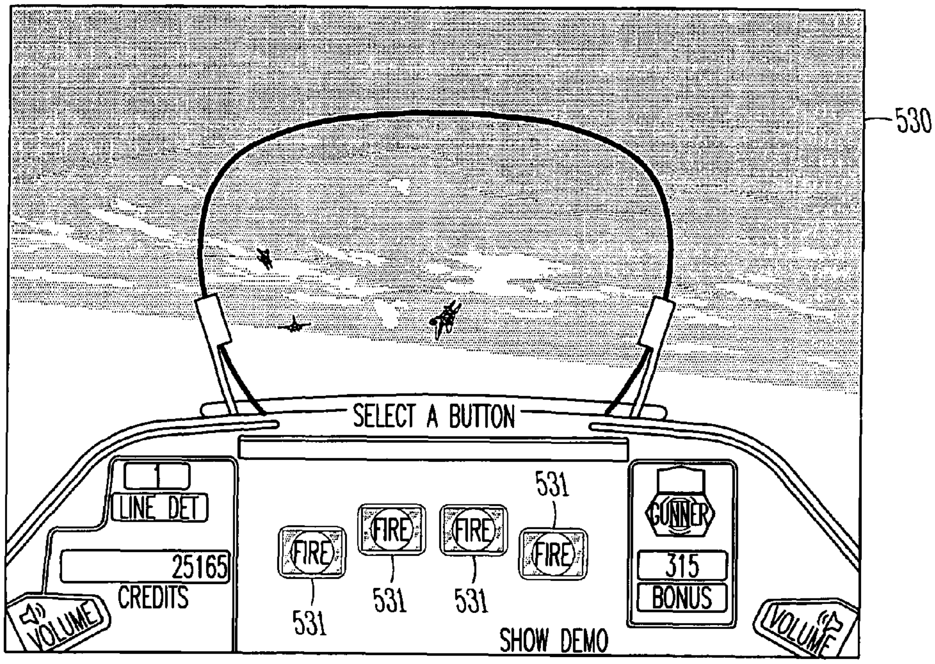
Figure 5M:
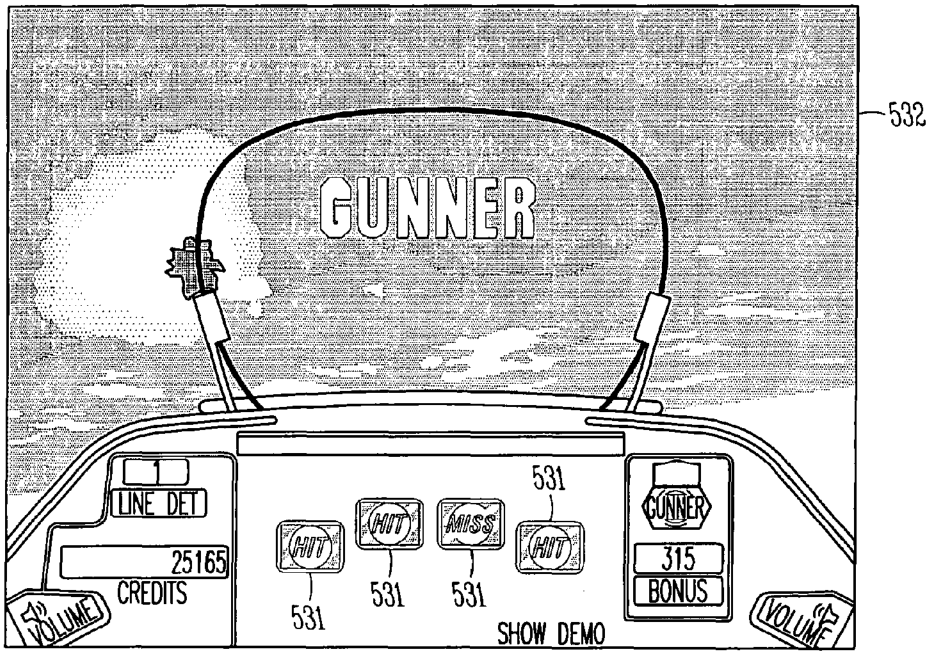
Figure 5N:
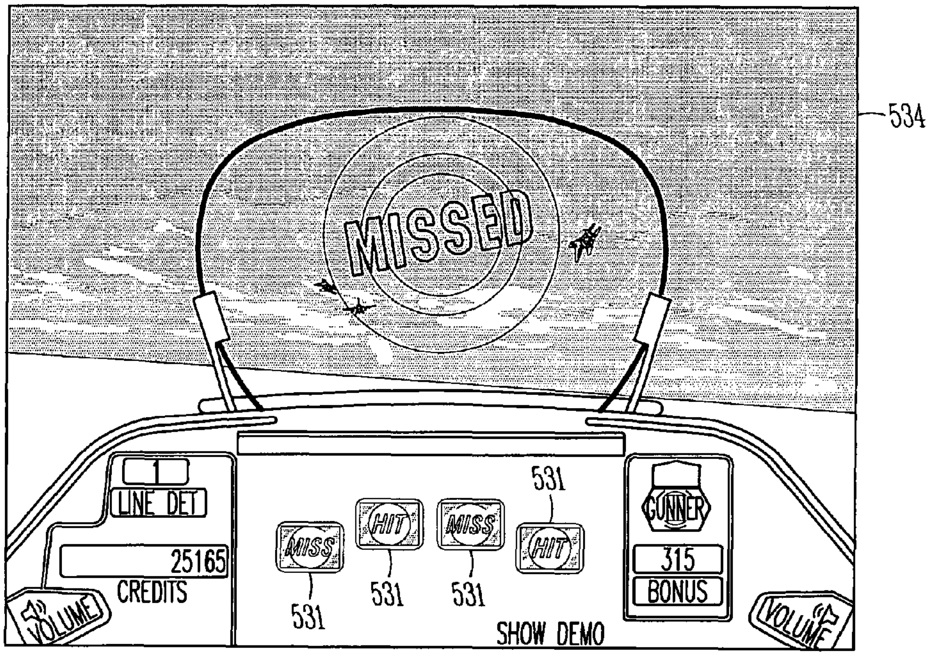
Figure 5O:
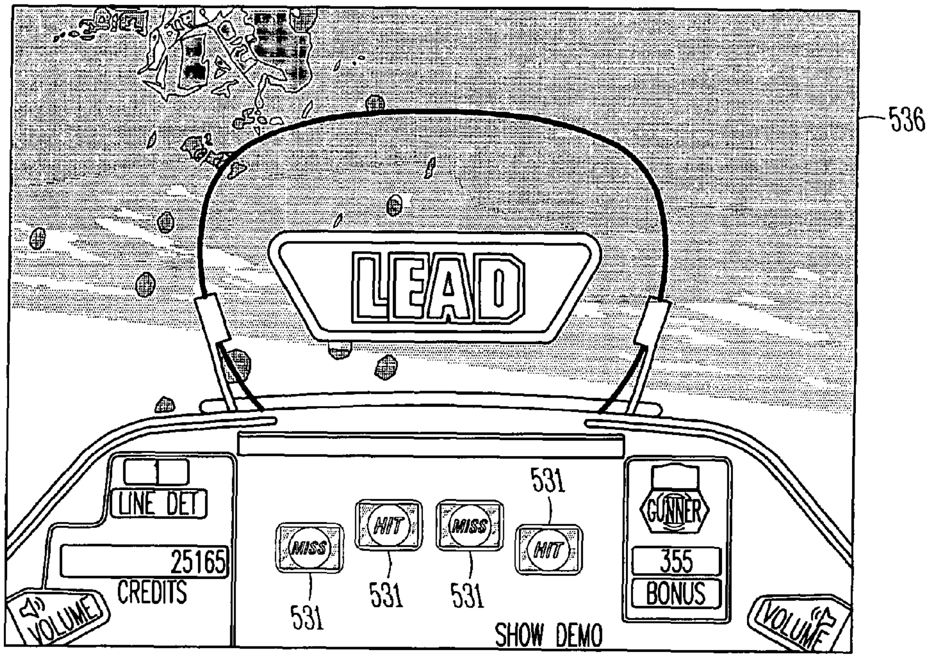
Figure 5P:
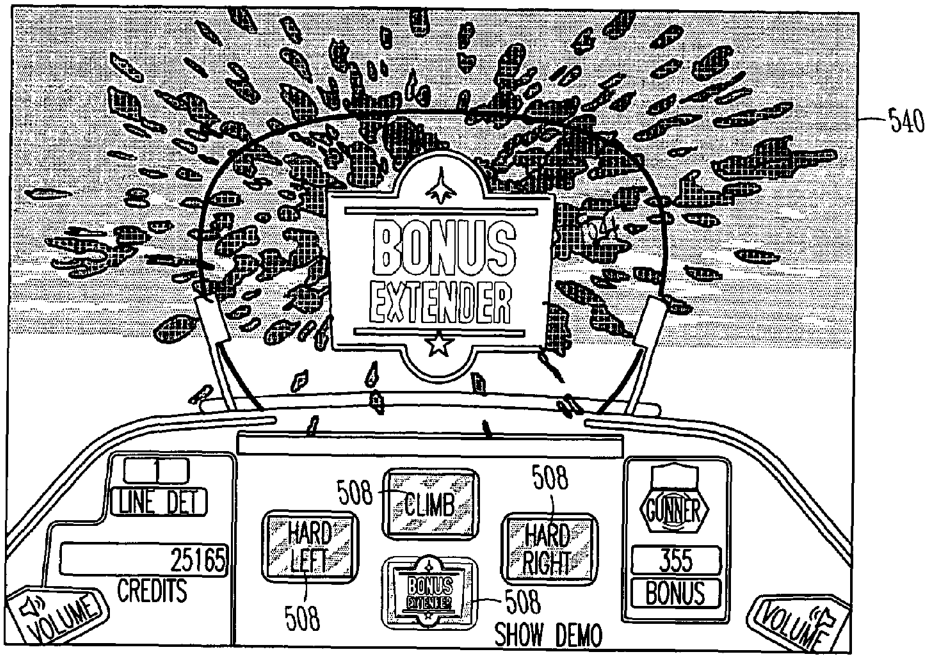
Figure 5Q:
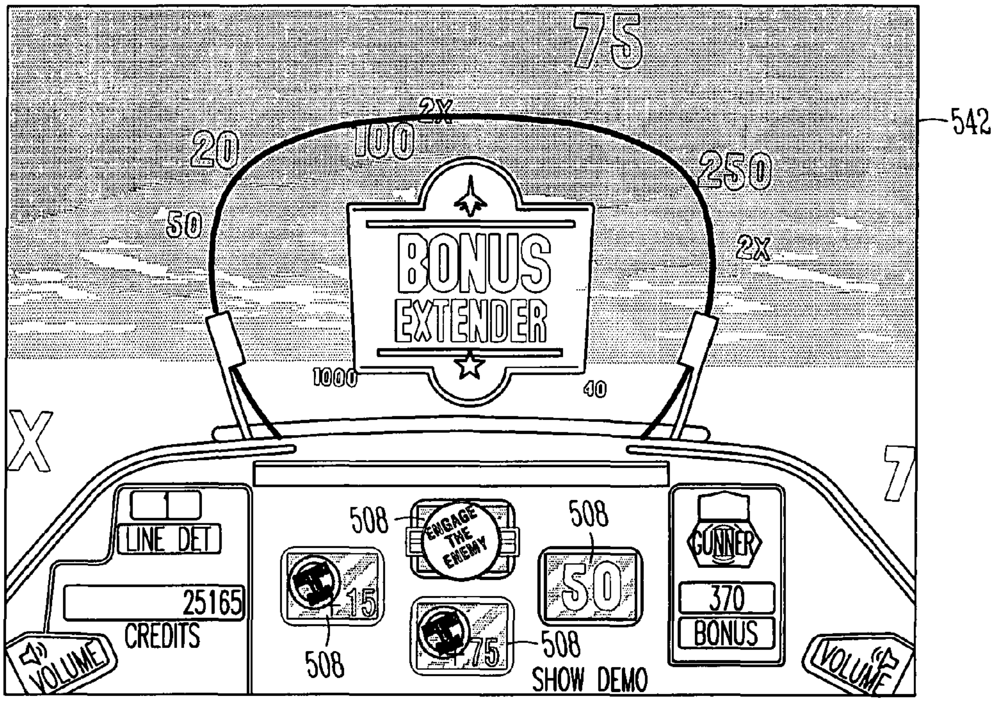

FIGS. 5A-5Q provide example screen images representing a method of providing a bonus round wagering game segment according to an embodiment of the invention. In general, the example embodiment provides a bonus round in which the goal is to maneuver an aircraft to earn as many credits as possible while evading enemy fire. Bonus award points may be awarded. In addition, shooting down enemy planes increases the fighter rank, which may be displayed on the top box or secondary display.

FIG. 5A is an illustration of a screen 500 in which a bonus round has been activated. In the example shown, the appearance of three "Top Gun" bonus symbols in payline 502 triggers the bonus round. However, as noted above, any suitable mechanism may be used to trigger a bonus round. In some embodiments, the display of the bonus round takes place on a primary display, replacing the display of reels or other wagering game symbols.

FIG. 5B illustrates an initial bonus round screen 506. The initial screen 506 comprises a continuously update image simulating the flight of an aircraft through air. Buttons 508 provide an input mechanism to control the simulated flight. For example, touching the buttons may cause the aircraft to bank left, bank right, climb, or perform a barrel roll.

FIG. 5C illustrates an example bonus round screen 510. The example bonus round screen 500 includes buttons 508, and graphical objects 512. In the example shown, graphical objects 512 represent various target objects. The target objects 512 may be bonus amounts or bonus multipliers.

FIG. 5D illustrates an example bonus round screen 514 in which the screen is updated in response to the "Hard Left" button of buttons 508 being pressed. The screen 514 is the result of rendering the image to reflect the aircraft's response to the "Hard Left" command.

FIG. 5E illustrates an example bonus round screen 516 in which the screen is updated in response to the "Hard Right" button of buttons 508 being pressed. The screen 516 is the result of rendering the image to reflect the aircraft's response to the "Hard Right" command.

In some embodiments, the buttons 508 may be labeled with values that may be obtained if the particular movement is executed, as illustrated by screen 518 in FIG. 5F. In the example shown, the "Hard Right" label has been replaced with a "50" label, indicating that if a hard right is executed, a bonus award amount of 50 may be obtained.

FIG. 5G illustrates a bonus round screen 520 showing that the aircraft has flown through a target object. In the example shown, the aircraft is flying through a target object having 20 bonus award points. As indicated above, the target object may be a bonus multiplier. In some embodiments, flying through a multiplier target objects causes all the numbers in the sky change colors and increase value. The multiplication lasts for the player's next maneuver and then goes back to the normal values. In some embodiments, successive multiplier values may be hit, causing compounded multiplication for the target bonus amounts.

In some embodiments, the system creates number billboards for the target objects in 3D space for the simulated aircraft to fly through. In the absence of an input indicating a change of direction, the aircraft flies through a track that does not intersect any target objects. In general, the plane will fly through 3D space around a continuous loop as if on a roller coaster varying altitude. In some embodiments, motion simulating random turbulence may be added. When the player presses: "Turn Right", "Turn Left", "Climb", or "Barrel Roll", the system selects approximately four numbers in the direction of the maneuver and creates a near miss path using splines to curve the plane in the necessary direction. The system determines which of the numbers to intersect and a fifth number in the distance that the player cannot see. If all four visible numbers are 'missed', the fifth number will be awarded. In some embodiments, the "Barrel Roll" input chooses numbers that are in the distance. All numbers are created dynamically. If the number is too close to the point of reference it is not eligible for awards. In some embodiments, when the plane is about to fly through the number, it changes colors and appears to momentarily stick to the cockpit screen.

FIG. 5I illustrates a bonus round screen 524 in which a "Return to Base" target object has been hit. In this example, the bonus round is then ended and the wagering game machine returns into a standard play mode.

FIG. 5J illustrates a bonus round screen 526 showing a modal target object labeled "Engage the Enemy" that appears among other target objects in the three-dimensional space. FIG. 5K illustrates a bonus round screen 526 where the modal target is hit (i.e. flown through) by the simulated aircraft. Upon hitting a modal target object, a second wagering game segment may be invoked, or a second mode of a bonus round may be invoked.

FIG. 5L illustrated an example screen image 530 showing a second mode of an example bonus round in which the target objects are now "enemy" aircraft, and buttons 508 are replaced with buttons 531 which represent missile firing buttons. The player may choose one of the four buttons to cause a missile to be fired. The player pushes 1 of 4 buttons to fire off a missile. If the plane is shot down, as illustrated by screen 532 of FIG. 5M, then in some embodiments, the player's rank is increased by one level (which may be represented on the top box) and another missile shot is awarded. If the missile misses the enemy fighter, as illustrated in example screen 534 illustrated in FIG. 5N, the bonus returns to the first mode of operation (e.g. evading enemy fire while attempting to fly through target objects). Shooting down five planes awards a Top Gun ranking and returns the player back to the first mode of operation in some embodiments. In some embodiments, as the player rank increase, it is displayed on the screen as illustrated in example screen 536 of FIG. 5O. At the end of the bonus, the player looks up at the top box to see which of the awards associated with the rank they have achieved has been won.

FIG. 5P illustrates a bonus extender screen 540 according to embodiments of the invention. Upon flying through a bonus extender target object 541, the system places a small icon 543 on the dashboard for future use, as illustrated in screen 542 of FIG. 5Q. When the system indicates what would ordinarily end the bonus round by signaling a 'Return to Base', the system ignores the request and continues the mission. The player can collect more than one Bonus Extender at one time.

In some embodiments, a rank achieved during the bonus round may be displayed, and an award associated with the rank may be randomly selected. The rank and associated award may be displayed on a top box or secondary display, and the player may be prompted on the primary display to look at the top box or secondary display in order to view the rank and award.

It should be noted that during the bonus round play, audio effects may be used to provide 3-dimensional sound and vibration to simulate the location of the aircraft.

FIGS. 6A-6F provide example screen images representing a method of providing a bonus round wagering game segment according to an embodiment of the invention. In general, the example embodiment illustrated in FIGS. 6A-6F provides a bonus round in which the goal is maneuver a car on one of a plurality of lanes (in some embodiments, three lanes). Bonus award points may be awarded for firing at a target car in a lane, and when the target car strikes other graphical objects in the scene.

Figure 6A:
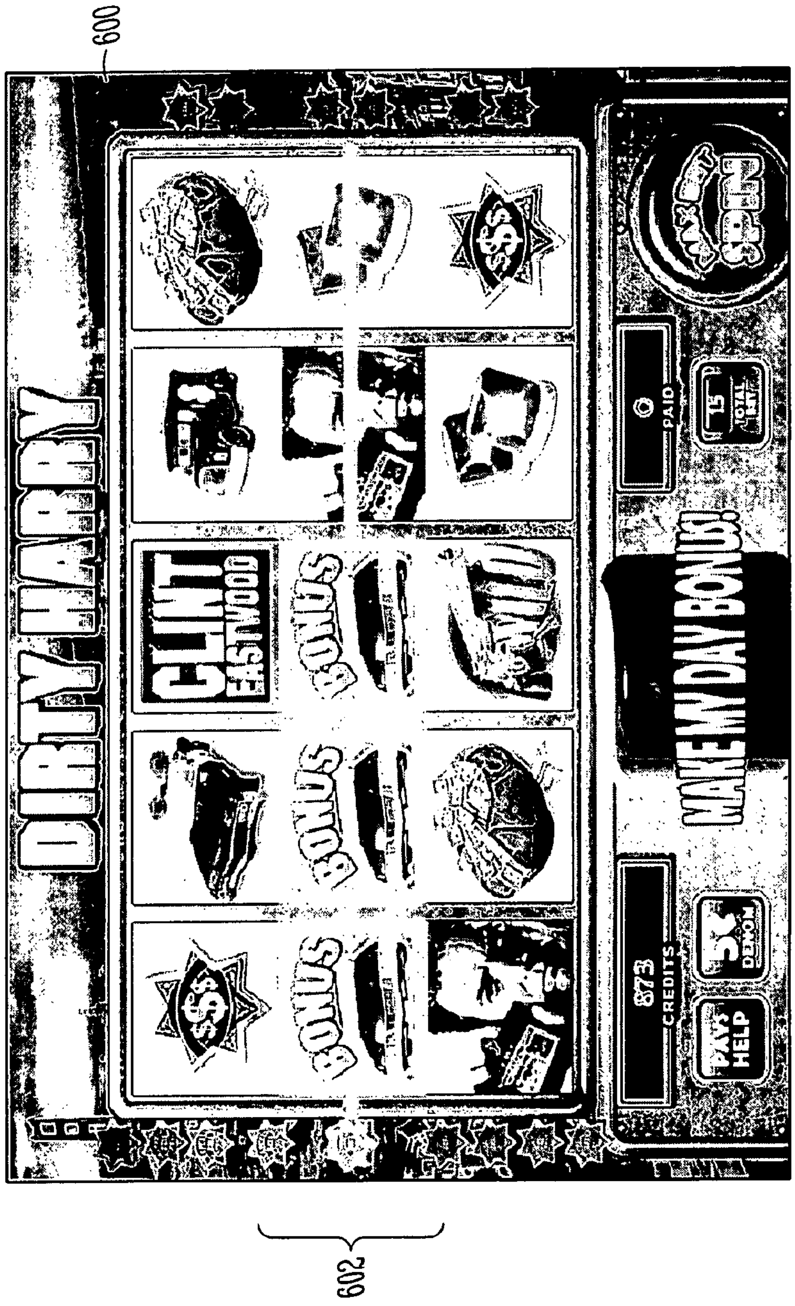
FIGS. 6A-6F are example screen shots illustrating the operation of an alternative example embodiment of the invention.

FIG. 6A is an illustration of a screen 600 in which a bonus round has been activated. In the example shown, the appearance of three bonus symbols in payline 602 triggers the bonus round. However, as noted above, any suitable mechanism may be used to trigger a bonus round. In some embodiments, the display of the bonus round takes place on a primary display, replacing the display of reels or other wagering game symbols.

Figure 6B:
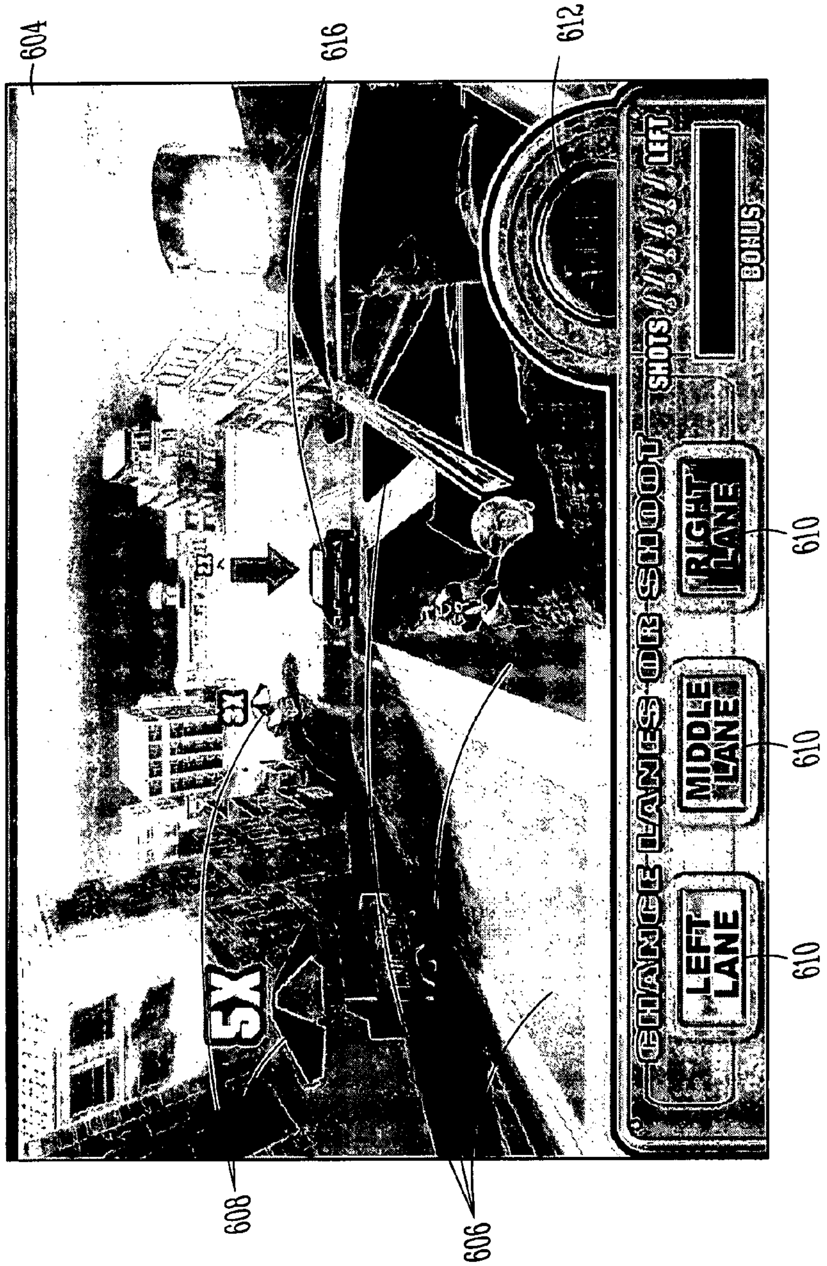

FIG. 6B illustrates an initial bonus round screen 604. The initial screen 604 comprises a continuously updated three-dimensional image that simulates driving a car along one of a plurality of lanes 606 in a street. The three-dimensional image may include other graphical objects 608 and a target object 616 (e.g. a target car). Buttons 610 provide an input mechanism to control which lane the car travels. For example, touching the buttons may cause the car to change to a left lane, a middle lane, or a right lane of lanes 606. The buttons may be pressed by a player as often as desired. In addition, a shoot button 612 may cause the occupant in the point of reference car to fire at the target car 616.

Figure 6C:
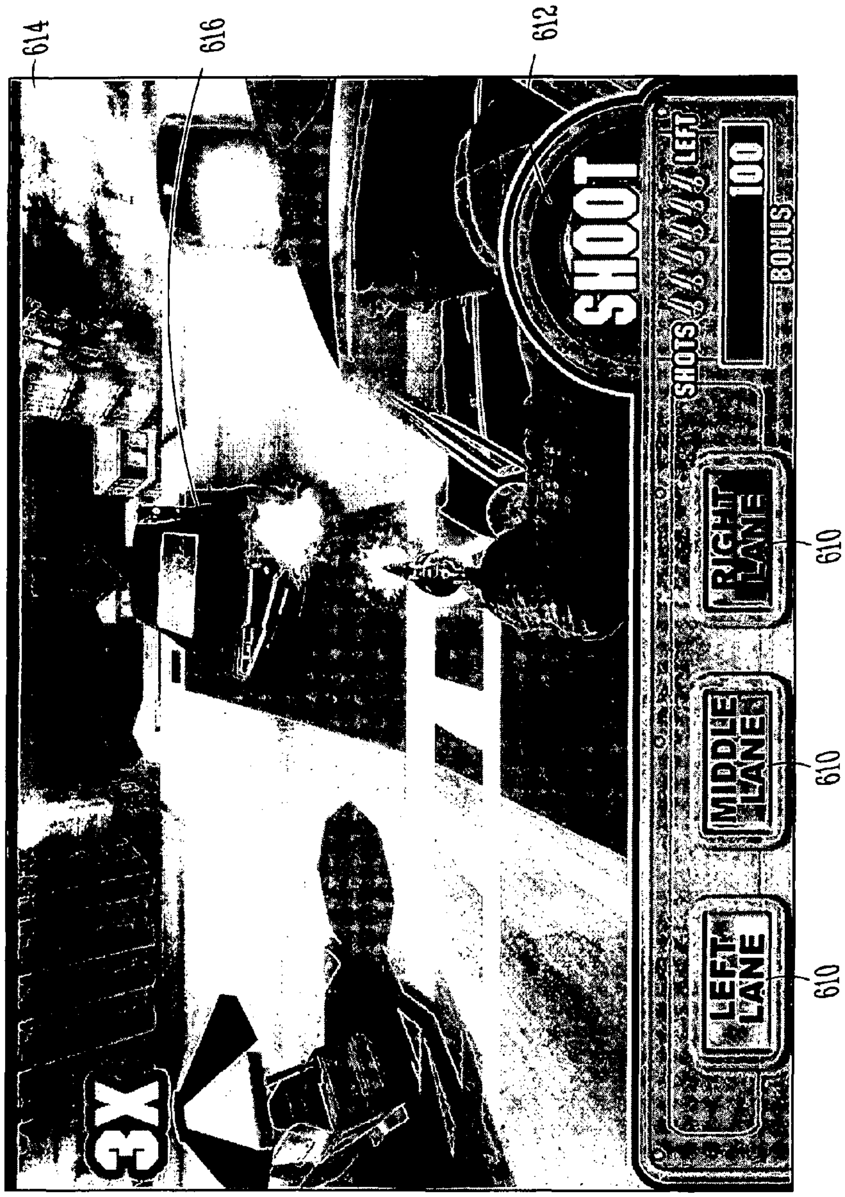
Figure 6D:

FIG. 6C is a screen image 614 illustrating the effects of shooting at a target car 616. In some embodiments, a "bit" is displayed on the target object. The hit may result in awarding a bonus amount as illustrated in screen 618 of FIG. 6D. In addition, the part of the car that is "hit" may be shown as falling off or disappearing.

Figure 6E:
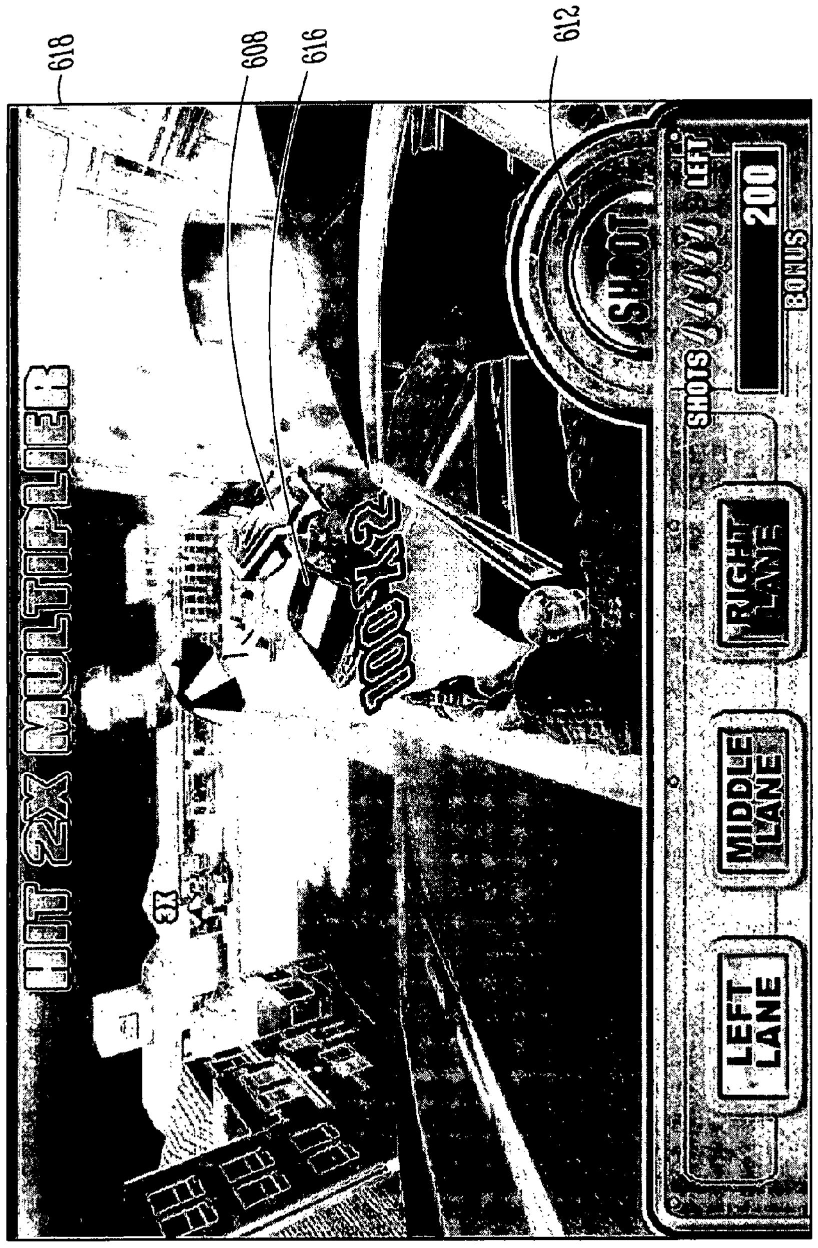

FIG. 6E is a screen image 618 illustrating the interaction of objects in the three-dimensional space. In some embodiments, a hit on a target car 616 may cause the system to randomly determine if the target car should swerve to strike another graphical object 608 on the screen. In some embodiments, if the target car strikes another graphical object, the bonus amount may be multiplied by a value displayed on the graphical object 608.

Figure 6F:
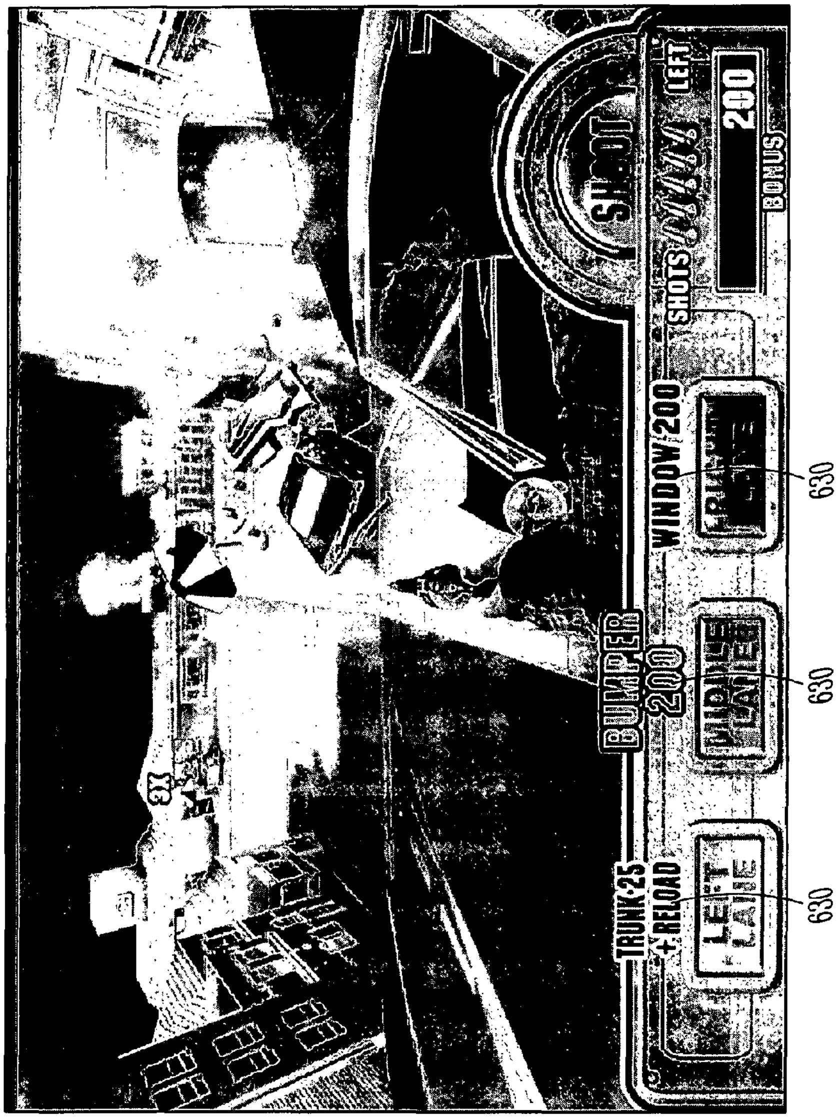

FIG. 6F is a screen image 620 according to embodiments of the invention. In some embodiments, the lane change buttons 606 also include labels 630 that indicate the bonus award that would have been obtained if the shot had been fired from the indicated lane. As illustrated in FIG. 6F, in some embodiments the bonus award is a reload, thereby extending the number of shots a player may take and extending the bonus round.

CONCLUSION

Systems and methods for presenting a wagering game segment in which a player navigates through a three-dimensional space on a display of a wagering game machines have been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the inventive subject matter.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

The Abstract is provided to comply with 37 C.F.R. §1.72(b) to allow the reader to quickly ascertain the nature and gist of the technical disclosure. The Abstract is submitted with the understanding that it will not be used to limit the scope of the claims.

What is claimed is:

1. A method comprising:

presenting a wagering game upon which monetary value may be wagered, the wagering game including one or more segments, the one or more segments having a scripted environment, the scripted environment having multiple scenes for simulating an illusion of continuous movement of a point of reference through a three-dimensional graphical environment along a predetermined track that forms at least one loop;

storing the predetermined track in a memory as a plurality of tiles, each tile having scene data for a respective one of the multiple scenes;

under control of one or more processors, serially transitioning through the multiple scenes of the scripted environment, along the predetermined track, the transitioning including:

reading scene data for one of the multiple scenes from the memory;

determining a set of one or more graphical elements to be displayed for the scene;

determining a set of one or more graphical characteristics associated with the scene;

rendering the scene of the three-dimensional graphical environment from the point of reference; and rendering the set of one or more graphical elements for the scene within the three-dimensional graphical environment in accordance with the set of one or more graphical characteristics for the scene defined by the scene data, the rendering including moving one or more of the set of graphical elements within the scene;

receiving, via an input device, an input indicating a change in the illusion of continuous movement through the three-dimensional graphical environment;

in response to the input, updating the set of one or more graphical elements of the scene, determining an outcome based on whether the point of reference is substantially close to a graphical element, and providing an award for the segment of the wagering game based on the closeness of the graphical element and the reference point; and determining a next scene.

2. The method of claim 1, wherein determining the set of one or more graphical elements to be displayed for the scene includes:

randomly generating one or more graphical elements.

3. The method of claim 1, wherein determining the set of one or more graphical elements to be displayed for the scene includes determining one or more graphical elements in accordance with a time of day, day of year, or current weather.

4. The method of claim 1, wherein the set of one or more graphical characteristics associated with the scene include one or more of a camera angle, a camera position, a lighting value, a lighting position or a perspective.

5. The method of claim 1, further comprising saving a path through the predetermined track.

6. The method of claim 1, further comprising checkpointing a current state of the point of reference in the predetermined track.

7. The method of claim 1, wherein the one or more segments of the wagering game comprises a bonus round.

8. The method of claim 1, wherein the outcome is determined upon receiving input that is independent of the input indicating the change in the illusion of continuous movement.

9. The method of claim 1, wherein the set of one or more graphical objects includes target objects.

10. The method of claim 9, further comprising detecting movement of the point of reference substantially through at least one of the target objects.

11. The method of claim 1, wherein the award for the segment of the wagering game comprises at least one of bonus points, a bonus multiplier or an extension of the segment of the wagering game.

12. The method of claim 1, further comprising dynamically determining the award for the segment of the wagering game according to the output of a random number generator after the input indicating the change in direction is received.

13. The method of claim 9, further comprising receiving an input indicating an action to be performed with respect to at least one of the target objects and selectively providing a bonus award in response to the action.

14. The method of claim 13, wherein the action includes firing at the at least one target object.

15. The method of claim 13, further comprising determining an interaction between a target object and a different graphical object within the scene upon receiving the input indicating an action to be performed.

16. The method of claim 13, further comprising displaying one or more alternative bonus awards associated with at least one of the target objects.

17. The method of claim 1, wherein the change in the illusion of continuous movement through the three-dimensional graphical environment includes changing a lane displayed within the scene.

18. The method of claim 1, wherein the predetermined track that forms at least one loop includes one or more paths that diverge from the loop and return to the loop.

19. A gaming system comprising:

a processor operable to present a wagering game upon which monetary value may be wagered;

a graphics engine operable to render a wagering game segment of the wagering game, the wagering game segment having a scripted environment, the scripted environment having multiple scenes for simulating an illusion of continuous movement of a point of reference through a three-dimensional graphical environment along a predetermined track that forms at least one loop;

a memory configured to store the predetermined track as a plurality of tiles, each tile having scene data for a respective one of the multiple scenes; and an input device, configured to receive an input from a user, the input indicating a change in a movement of the point of reference through the three-dimensional graphical environment;

wherein the graphics engine is configured to serially transition through the multiple scenes of the scripted environment, along the predetermined track, the transitioning including:

reading scene data for one of the multiple scenes from the memory;

determining a set of one or more graphical elements to be displayed for the scene;

determining a set of one or more graphical characteristics associated with the scene;

rendering the scene of the three-dimensional graphical environment from the point of reference; and rendering the set of one or more graphical elements for the scene within the three-dimensional graphical environment in accordance with the set of one or more graphical characteristics for the scene defined by the scene data, the rendering including moving one or more of the set of graphical elements within the scene;

receiving the input indicating a change in the illusion of continuous movement through the three-dimensional graphical environment;

in response to the input, updating the set of one or more graphical elements of the scene, determining an outcome based on whether the point of reference is substantially close to a graphical element, and providing an award for the segment of the wagering game based on the closeness of the graphical element and the reference point; and determining a next scene.

20. The gaming system of claim 19, wherein determining the set of one or more graphical elements to be displayed for the scene includes randomly generating one or more graphical elements.

21. The gaming system of claim 19, wherein the set of one or more graphical objects includes a plurality of target objects.

22. The gaming system of claim 21, wherein the plurality of target objects are associated with one or more alternative bonus awards.

23. The gaming system of claim 19, further comprising a physics engine operable to at least in part determine how the set of graphical elements of the scene are rendered by the graphics engine.

24. A non-transitory machine-readable medium having machine executable instructions for causing one or more processors to perform a method, the method comprising:

presenting a wagering game upon which monetary value may be wagered, the wagering game including one or more segments, the one or more segments having a scripted environment, the scripted environment having multiple scenes for simulating an illusion of continuous movement of a point of reference through a three-dimensional graphical environment along a predetermined track that forms at least one loop;

storing the predetermined track in a memory as a plurality of tiles, each tile having scene data for a respective one of the multiple scenes;

under the control of the one or more processors, serially transitioning through the multiple scenes of the scripted environment, along the predetermined track, the transitioning including:

reading scene data for one of the multiple scenes from the memory;

determining a set of one or more graphical elements to be displayed for the scene;

determining a set of one or more graphical characteristics associated with the scene;

rendering the scene of the three-dimensional graphical environment from the point of reference; and rendering the set of one or more graphical elements for the scene within the three-dimensional graphical environment in accordance with the set of one or more graphical characteristics for the scene defined by the scene data, the rendering including moving one or more of the set of graphical elements within the scene;

receiving, via an input device, an input indicating a change in the illusion of continuous movement through the three-dimensional graphical environment;

in response to the input, updating the set of one or more graphical elements of the scene, determining an outcome based on whether the point of reference is substantially close to a graphical element, and providing an award for the segment of the wagering game based on the closeness of the graphical element and the reference point; and determining a next scene.

25. The non-transitory machine-readable medium of claim 24, wherein the predetermined track that forms at least one loop includes one or more paths that diverge from the loop and return to the loop.

* * * * *